US010656634B2

(12) United States Patent
Chen et al.

(10) Patent No.: US 10,656,634 B2
(45) Date of Patent: May 19, 2020

(54) OPTICAL SENSOR OPTIMIZATION AND SYSTEM IMPLEMENTATION WITH SIMPLIFIED LAYER STRUCTURE

(71) Applicant: Halliburton Energy Services, Inc., Houston, TX (US)

(72) Inventors: Dingding Chen, Tomball, TX (US); David L. Perkins, The Woodlands, TX (US); Christopher Michael Jones, Houston, TX (US); Li Gao, Katy, TX (US); Jing Shen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 776 days.

(21) Appl. No.: 14/432,336

(22) PCT Filed: May 7, 2013

(86) PCT No.: PCT/US2013/039837
§ 371 (c)(1),
(2) Date: Mar. 30, 2015

(87) PCT Pub. No.: WO2014/182282
PCT Pub. Date: Nov. 13, 2014

(65) Prior Publication Data
US 2015/0277438 A1 Oct. 1, 2015

(51) Int. Cl.
*G05B 19/418* (2006.01)
*G06N 3/02* (2006.01)
(Continued)

(52) U.S. Cl.
CPC ............ *G05B 19/4188* (2013.01); *G01J 3/28* (2013.01); *G02B 5/281* (2013.01);
(Continued)

(58) Field of Classification Search
CPC ...... G05B 19/4188; G05B 2219/41054; G05B 2219/45032; G02B 5/281; G02B 27/0012;
(Continued)

(56) References Cited

U.S. PATENT DOCUMENTS 5,428,711 A * 6/1995 Akiyama .............. G02F 1/1354
706/40
5,555,471 A 9/1996 Xu et al.
(Continued)

OTHER PUBLICATIONS

Soyemi, et al. "Nonlinear Optimization Algorithm for Multivariate Optical Element Design." Applied Spectroscopy, vol. 56, No. 4 (2002) [retrieved on May 20, 2017].*
(Continued)

*Primary Examiner* — Rehana Perveen
*Assistant Examiner* — Alfred H B Wechselberger
(74) *Attorney, Agent, or Firm* — Benjamin Fite; Baker Botts L.L.P.

(57) ABSTRACT

This disclosure includes methods for designing a simplified Integrated Computational Element (ICE) and for optimizing a selection of a combination of ICE designs. A method for fabricating a simplified ICE having one or more film layers includes predicting an optimal thickness of each of the one or more film layers of the simplified ICE using a neural network. A method for recalibrating the fabricated ICE elements for system implementation is also disclosed. The disclosure also includes the simplified ICE designed by and the ICE combination selected by the disclosed methods. The disclosure also includes an information handling system with machine-readable instructions to perform the methods disclosed herein.

10 Claims, 16 Drawing Sheets

(51) Int. Cl.
  G02B 27/00    (2006.01)
  G06E 3/00     (2006.01)
  G01N 21/31    (2006.01)
  G06N 3/12     (2006.01)
  G01J 3/28     (2006.01)
  G02B 5/28     (2006.01)
  G01J 3/12     (2006.01)

(52) U.S. Cl.
  CPC ......... *G02B 27/0012* (2013.01); *G06E 3/001* (2013.01); *G06N 3/02* (2013.01); *G06N 3/126* (2013.01); *G01J 2003/1226* (2013.01); *G01N 21/31* (2013.01); *G05B 2219/41054* (2013.01); *G05B 2219/45032* (2013.01)

(58) Field of Classification Search
  CPC .... G01J 3/28; G01J 2003/1226; G01N 21/31; G06E 3/001
  See application file for complete search history.

(56) References Cited

U.S. PATENT DOCUMENTS

| | | | |
|---|---|---|---|
| 5,649,063 A * | 7/1997 | Bose | G05B 13/027 706/23 |
| 5,737,496 A * | 4/1998 | Frye | G05B 13/027 706/23 |
| 5,864,633 A | 1/1999 | Opsal et al. | |
| 5,900,633 A | 5/1999 | Solomon et al. | |
| 6,246,972 B1 | 6/2001 | Klimasauskas | |
| 6,542,876 B1 | 4/2003 | Kikuchi et al. | |
| 6,627,900 B2 * | 9/2003 | Fukui | H01J 37/3023 250/396 R |
| 6,657,798 B1 * | 12/2003 | Kabelevs | G01M 11/0221 353/100 |
| 6,789,620 B2 | 9/2004 | Schultz et al. | |
| 7,050,179 B2 | 5/2006 | Sidorowich | |
| 7,138,156 B1 * | 11/2006 | Myrick | G02B 5/285 427/10 |
| 7,167,615 B1 * | 1/2007 | Wawro | G01N 21/648 385/12 |
| 7,330,279 B2 | 2/2008 | Vuong et al. | |
| 7,505,153 B2 | 3/2009 | Vuong et al. | |
| 7,911,605 B2 * | 3/2011 | Myrick | G01J 3/02 356/300 |
| 7,915,586 B2 | 3/2011 | Shelley et al. | |
| 8,075,942 B1 | 12/2011 | Muray et al. | |
| 8,102,542 B2 * | 1/2012 | Gagnon | B64D 15/20 356/625 |
| 2005/0010090 A1 * | 1/2005 | Acosta | A61B 5/0075 600/316 |
| 2005/0174664 A1 * | 8/2005 | Ito | G02B 5/281 359/883 |
| 2007/0249071 A1 | 10/2007 | Lian et al. | |
| 2009/0297044 A1 * | 12/2009 | Kokumai | G06K 9/40 382/219 |
| 2010/0326955 A1 | 12/2010 | Gao et al. | |
| 2013/0032736 A1 | 2/2013 | Tunheim et al. | |
| 2013/0085972 A1 * | 4/2013 | Hwang | G06N 3/02 706/16 |
| 2014/0255598 A1 * | 9/2014 | Simcock | G06F 17/50 427/10 |

OTHER PUBLICATIONS

Khor, et al. "Learning the Search Range for Evolutionary Optimization in Dynamic Environments." Knowledge and Information Systems, vol. 4, pp. 228-255 [retrieved on Jul. 28, 2017]. Retrieved from <https://link.springer.com/article/10.1007%2Fs101150200006?Ll=true>.*

Tabet, et al. "Use of artificial neural networks to predict thickness and optical constants of thin films from reflectance data." Thin Solid Films, vol. 370 (2000), pp. 122-127 [retrieved on Jul. 27, 2017]. Retrieved from <http://www.sciencedirect.com/science/article/pii/S0040609000009524>.*

Michalewicz, et al. "Evolutionary Algorithms for Constrained Parameter Optimization Problems." [retrieved on Jul. 28, 2017]. Retrieved from <http://www.mitpressjournals.org/doi/pdf/10.1162/evco.1996.4.1.1>.*

Nelson, et al. "Multivariate Optical Computation for Predictive Spectroscopy." Analytical Chemistry, vol. 70, No. 1 (1998) [retrieved on Jul. 27, 2017]. Retrieved from <http://pubs.acs.org/doi/abs/10.1021/ac970791w>.*

Thorp, et al. "Estimating crop biophysical properties from remote sensing data by inverting linked radiative transfer and ecophysiological models." Remote Sensing of Environments, vol. 124 (2012) [retrieved on Jul. 28, 2017]. Retrieved from <http://www.sciencedirect.com/science/article/pii/S0034425712002167>.*

Blanco et al., "Artificial Neural Networks and Partial Least Squares Regression for Pseudo-first-order With Respect to the Reagent Multicomponent Kinetic-spectrophotometric Determinations." Analyst, vol. 121 (1996), pp. 395-300 [retrieved on May 22, 2017]. Retrieved from <http://pubs.rsc.org/en/content/articlepdf/1996/AN/AN9962100395>.*

Mathews, V. "A Stochastic Gradient Adaptive Filter with Gradient Adaptive Step Size." IEEE Transactions on Signal Processing, vol. 41, No. 6 (1993) [retrieved on Aug. 4, 2017]. Retrieved from <http://ieeexplore.ieee.org/stamp/stamp.jsp?arnumber=1261952>.*

"Convolute" OED Online. Mar. 2018. Oxford University Press [retrieved May 26, 2018]. Retrieved from <http://www.oed.com/view/Entry/40877>.*

"Transmission spectrum" CMO:0000939. Royal Society of Chemistry [retrieved on May 23, 2018]. Retrieved from <http://www.rsc.org/publishing/journals/prospect/ontology.asp?id=CMO:0000939&MSID=B314305H>.*

Dobrowolski, et al. "Refinement of optical multilayer systems with different optimization procedures" Applied Optics, vol. 29, No. 19 (1990) [retrieved on Jul. 27, 2017]. Retrieved from <https://www.osapublishing.org/ao/abstract.cfm?uri=ao-29-19-2876>.*

Vasseur et al. "Investigation of manufactrugin processes by numerical sensitivity analysis" Proc. SPIE 8168, Advances in Optical Thin Films IV (2011), doi: 10.1117/12.896785 [retrieved on May 23, 2018]. Retrieved from <https://www.spiedigitallibrary.org/conference-proceedings-of-spie/8168/81680A/Investigation-of-manufacturing-processes-by-numerical>.*

"Algorithm" OED Online. Jun. 2018. Oxford University Press [retrieved Jun. 28, 2018]. Retrieved from <http://www.oed.com/view/Entry/4959>.*

"Thin film". Wikipedia.com [retrieved on Mar. 27, 2019]. Retrieved from <https://en.wikipedia.org/wiki/Thin_film> (Year: 2019).*

"Sigmoid function". Wikipedia.com [retrieved Mar. 27, 2019]. Retrieved from <https://en.wikipedia.org/wiki/Sigmoid_function> (Year: 2019).*

Dobrowolski et al. "Interference Filters With Irregular Spectral Transmittance Characteristics" Proc. SPIE 0050, Optical Coatings: Apps. and Util. I; doi: 10.1117/12.954113 [retrieved on Sep. 11, 2019]. Retrieved from <https://www.spiedigitallibrary.org/proceedings/Download?fullDOI=10.1117/12.954113> (Year: 1974).*

Tikhonravov et al. "Modern design tools and a new paradigm in optical coating design" Applied Optics, vol. 51, No. 30, pp. 7319-7332 [retrieved on Sep. 11, 2019]. Retrieved from <https://www.osapublishing.org/abstract.cfm?uri=ao-51-30-7319> (Year: 2012).*

Tikhonravov et al. "Optical coating design algorithm based on the equivalent layers theory" Applied Optics, vol. 45, No. , pp. 1530-1538 [retrieved on Sep. 11, 2019]. Retrieved from <https://www.osapublishing.org/abstract.cfm?uri=ao-45-7-1530> (Year: 2006).*

Yakovlev et al. "Optimization of chirped mirrors" Applied Optics, vol. 41, No. 30, pp. 6514-6520 [retrieved on Sep. 11, 2019]. Retrieved from <https://www.osapublishing.org/abstract.cfm?uri=ao-41-30-6514> (Year: 2008).*

Birge et al. "Improving thin-film manufacturing yield with robust optimization" Applied Optics, vol. 50, No. 9, pp. C36-C40 [retrieved on Sep. 11, 2019]. Retrieved from <https://www.osapublishing.org/abstract.cfm?uri=ao-50-9-C36> (Year: 2011).*

(56) References Cited

OTHER PUBLICATIONS

International Search Report and Written Opinion issued in related PCT Application No. PCT/US2013/039837 dated Apr. 15, 2014, 17 pages.
Baumeister, Philip W., "Optical Coating Technology" in "A Book Used at a Five Day Short Course, Engineering 823.17" presented at University of California at Los Angeles, University Extension, Department of Engineering, Information Systems, and Technical Management, Jan. 12-16, 1998.
Soyemi, O.O. et al., "Nonlinear Optimization Algorithm for Multivariate Optical Element Design", Applied Spectroscopy, vol. 56, No. 4 (Apr. 1, 2002), pp. 477-487.
Sartore, Richard G., United States Statutory Invention Registration No. H993, published Nov. 5, 1991.

\* cited by examiner

OPTICAL SENSOR OPTIMIZATION AND SYSTEM IMPLEMENTATION WITH SIMPLIFIED LAYER STRUCTURE

CROSS-REFERENCE TO RELATED APPLICATION

The present application is a U.S. National Stage Application of International Application No. PCT/US2013/039837 filed May 7, 2013, which is incorporated herein by reference in its entirety for all purposes.

BACKGROUND

This disclosure relates to fluid analysis in or near a hydrocarbon wellbore.

Optical sensors implemented with a variety of Integrated Computational Elements (ICEs) have found increased applications in identifying physical and chemical properties of diverse subsurface and surface fluids. ICEs typically have multiple high and low refractive index film layers deposited on a substrate material, which function as multi-band filters in multivariate optical computing systems for linear and nonlinear calibration analyses.

Typical ICE designs often have a large number of film layers (i.e., more than five) in order to achieve performance adjustability. However, optimizing the layered structure with many films of different thicknesses often requires high computational power and intensity in the simulation analysis and fabricability study stages. Manufacturing ICEs with many film layers may also have a negative impact on quality control and cost reduction.

It is desirable to minimize the number of film layers in an ICE in order to reduce the cost associated with its design and fabrication without sacrificing quality performance. Additionally, it is desirable to use two or more ICEs in combination to overcome limitations inherent in using a single ICE. Quality control may be performed to prevent ICE performance degradation during fabrication, and post-manufacturing calibration may be applied to enhance the implementation of the system.

BRIEF DESCRIPTION OF THE DRAWING(S)

The present disclosure will be more fully understood by reference to the following detailed description of the preferred embodiments of the present disclosure when read in conjunction with the accompanying drawings, in which like reference numbers refer to like parts throughout the views, wherein.

Figure 12A:
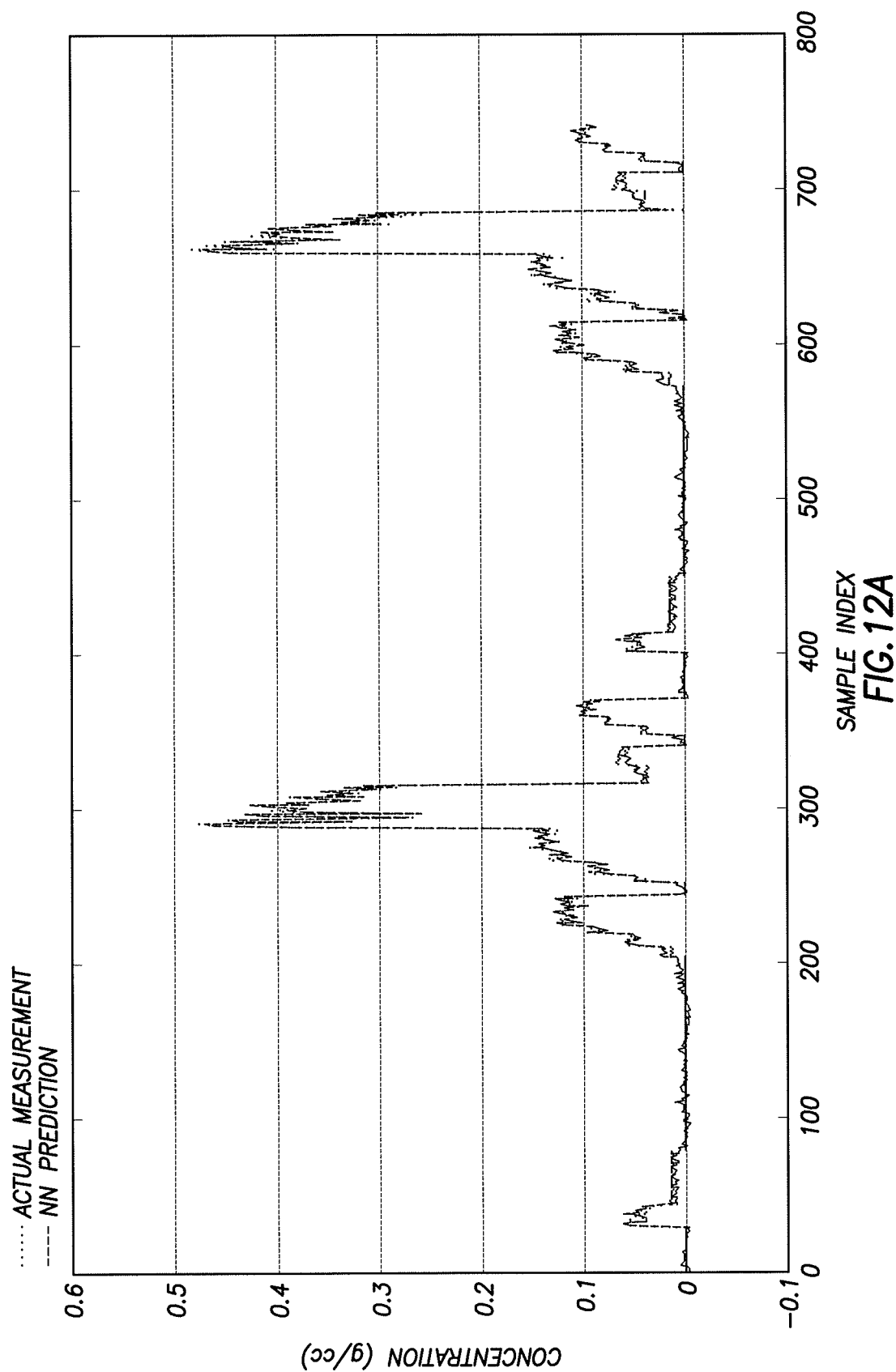
Figure 12B:
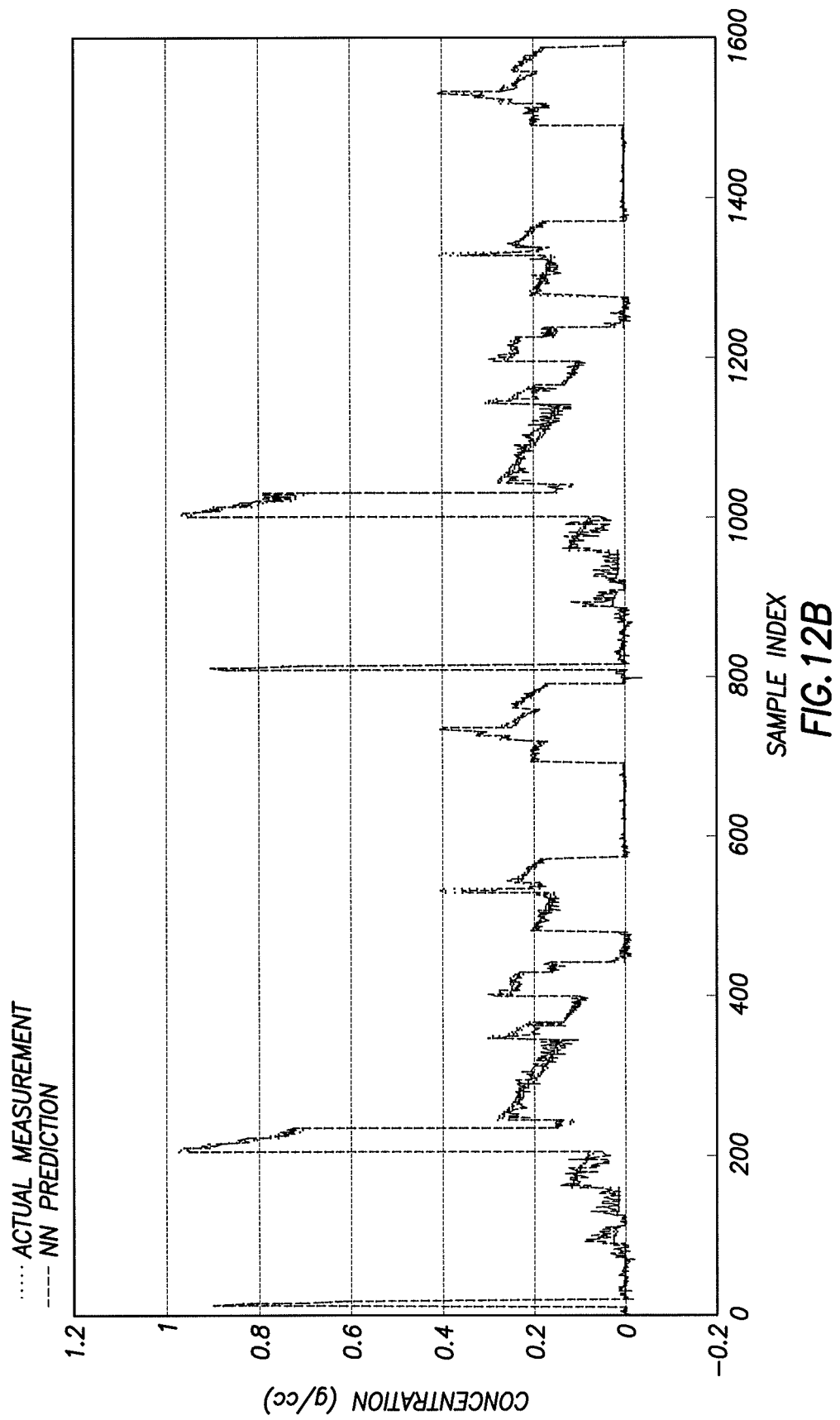

FIGS. 12A-B depict comparisons of neural network predictions and actual measurements of ICE combinations.

The disclosure may be embodied in other specific forms without departing from the spirit or essential characteristics thereof. The present embodiments are therefore to be considered in all respects as illustrative and not restrictive, the scope of the disclosure being indicated by the appended claims rather than by the foregoing description, and all changes which come within the meaning and range of equivalency of the claims are therefore intended to be embraced therein.

DETAILED DESCRIPTION OF THE DISCLOSURE

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The terms "couple" or "couples," as used herein are intended to mean either an indirect or a direct connection. Thus, if a first device couples to a second device, that connection may be through a direct connection, or through an indirect electrical or mechanical connection via other devices and connections. Similarly, the term "communicatively coupled" as used herein is intended to mean either a direct or an indirect communication connection. Such connection may be a wired or wireless connection such as, for example, Ethernet or LAN.

The term "information handling system" as used herein is intended to include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the information handling system may be a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

The methods and systems disclosed herein may be used in conjunction with developing natural gas wells or hydrocarbon wells in general. Such wells may be used for production, monitoring, or injection in relation to the recovery of hydrocarbons or other materials from the subsurface. This could also include geothermal wells intended to provide a source of heat energy instead of energy from hydrocarbons.

Figure 1:
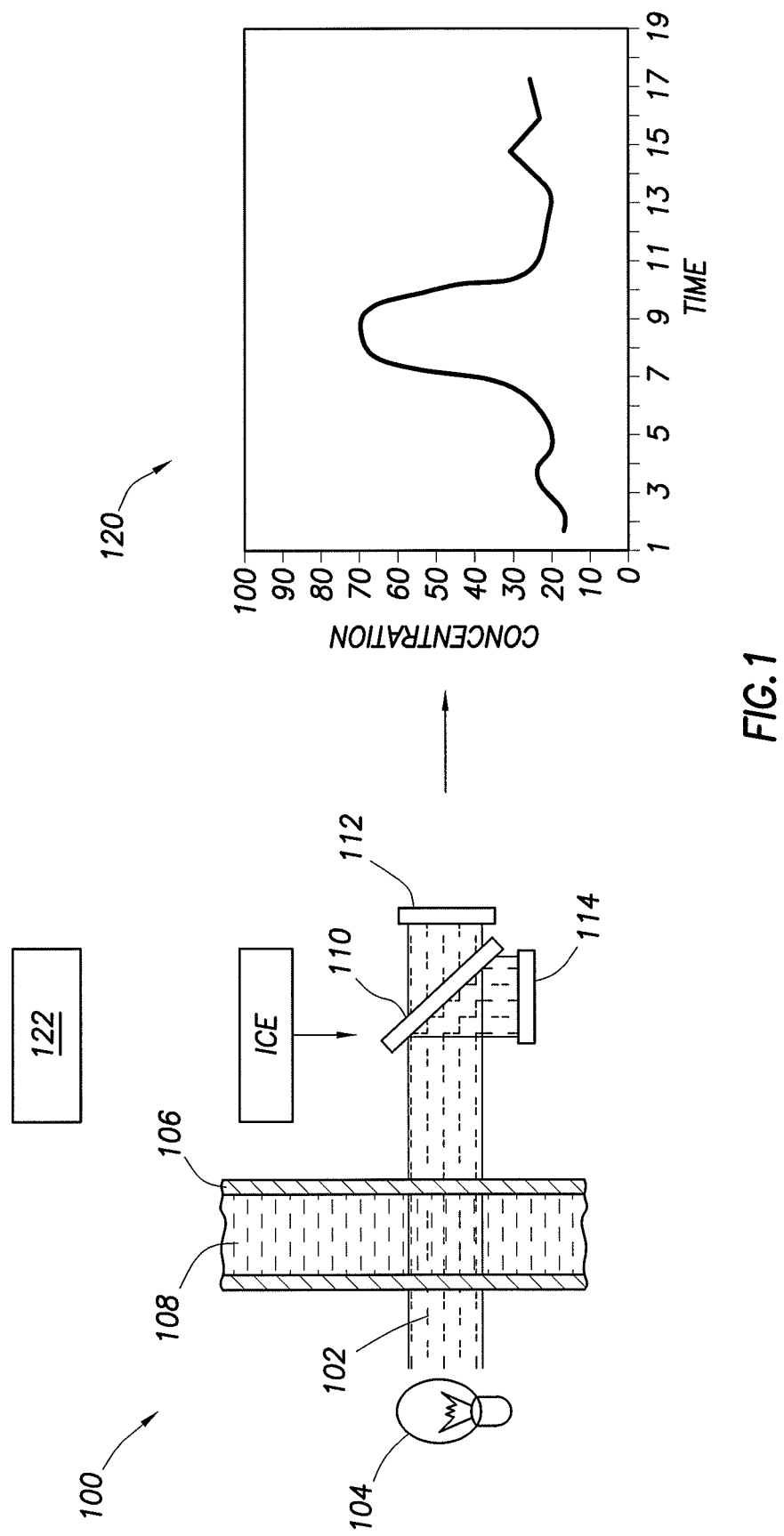
FIG. 1 depicts general operation of an ICE system in accordance with a first implementation.

Referring now to FIG. 1, a device for performing optical analysis is referenced generally by reference numeral 100. Light 102 is directed from a light source 104 through a flow pipe 106 containing a fluid 108. The flow pipe 106 may be a casing, tubing, or sample cell. The light 102 then travels through an ICE 110 located on the opposite end of the flow pipe 106 from the light source 104. The ICE 110 directs the light 102 to a first detector 112 and a second detector 114. The output of the first detector 112 may be a property or concentration of interest of an analyte. The first detector 112 and second detector 114 may be communicatively coupled to an information handling system 122. The information handling system 122 may be placed downhole, uphole, or at a remote location. The information handling system 122 may include a user interface permitting a user to monitor and manage the operation of the information handling system 122. Additionally, the information handling system 122 may include a processor that utilizes machine-readable instructions to perform the methods disclosed herein. The output from the first and second detectors 112, 114 may be converted by the information handling system 122 to an appropriate signal for communication purposes via standard electronic systems. For instance, the illustrative graph 120 depicts the change in concentration of a desired component of the analyte over time. The property or concentration result, in real time, may be displayed by the information handling system 122. It may also be employed in an active feedback loop to control the property or concentration of interest or may be used to alert for certain desired conditions, such as an out of range condition or an interrupted flow. The second detector 114 may be used to normalize the signal of the first detector 112 for light intensity variations, scattering effects, and the like.

Figure 2:
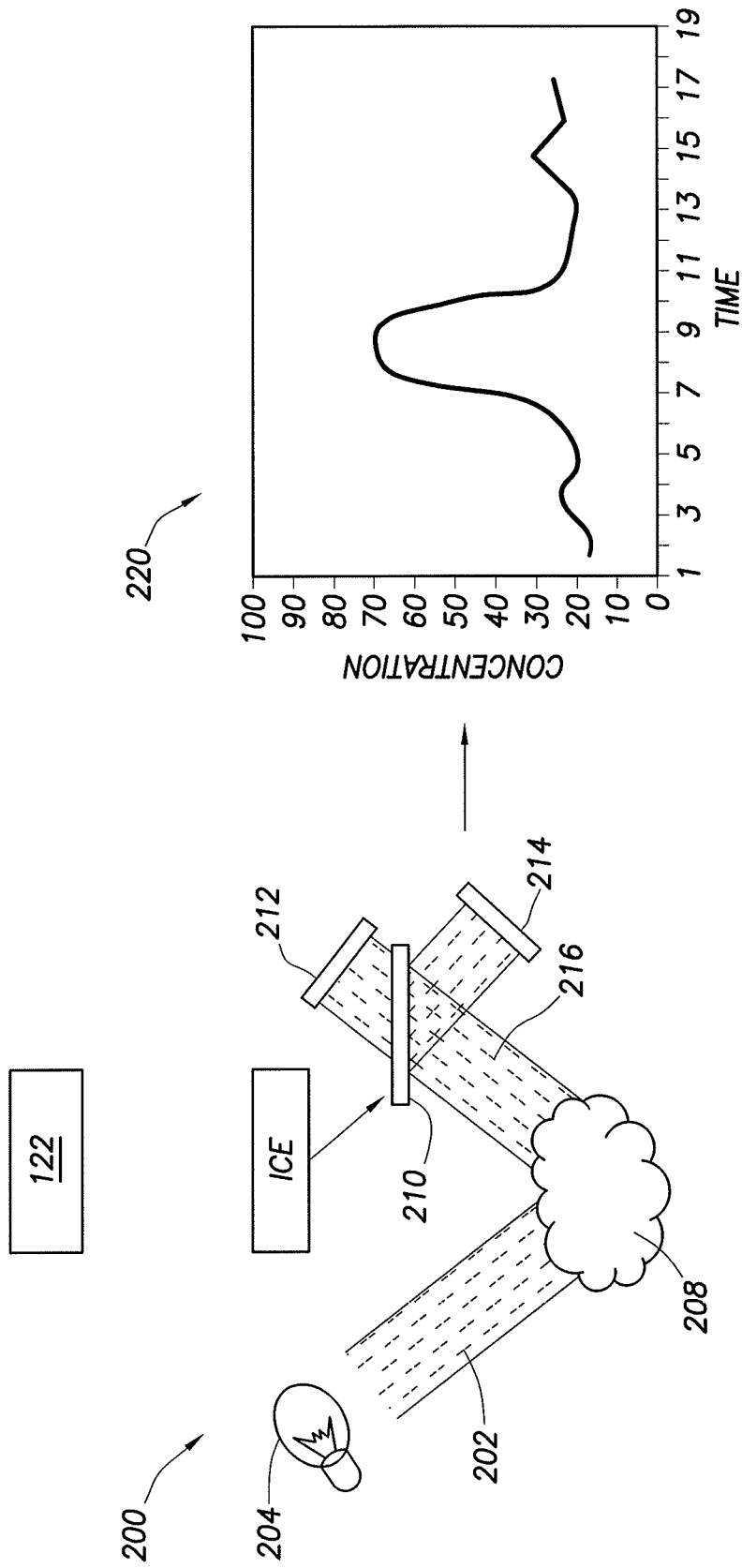
FIG. 2 depicts general operation of an ICE system in accordance with a second implementation.

Referring now to FIG. 2, another device for performing optical analysis is referenced generally by reference numeral 200. The device 200 may be used to analyze materials that are not transparent in a manner similar to that described with respect to analysis of transparent materials in conjunction with FIG. 1. Such non-transparent materials may include, but are not limited to, muds, powders, solids, and slurries. Light 202 is directed from a light source 204 toward an opaque sample 208 and is reflected off the opaque sample 208. The reflected light 216 passes through an ICE 210 and is collected at a first detector 212 and a second detector 214 in a manner similar to that discussed in conjunction with FIG. 1. The first and second detectors 212, 214 may be communicatively coupled to the information handling device 122. As in FIG. 1, the illustrative graph 220 depicts the change in concentration of a desired component of the opaque sample 208 over time. The graph 220 may be prepared by the information handling device 122.

FIGS. 1 and 2 depict illustrative implementations of using an ICE. However, variations may be made to the general systems of FIGS. 1 and 2. For example, one variation may allow measurement of more than one property of a sample at a time. Another variation may allow for measurement of properties of samples at different locations. Another variation may use two substantially different light sources, e.g., UV and IR, to cover the optical activity of all the properties of interest. Other variations may not include an active light source, but instead use the heat from the sample itself as the excitation source. Different variations may use multiple ICEs in series or in parallel.

The ICE 110 or 210 may be constructed of a number of film layers. The present disclosure utilizes a method for reducing and optimizing the number of film layers included in an ICE. Further, the thickness of each film layer may be optimized and reduced, making the design more efficient, more cost-effective, and smaller.

Figure 3:
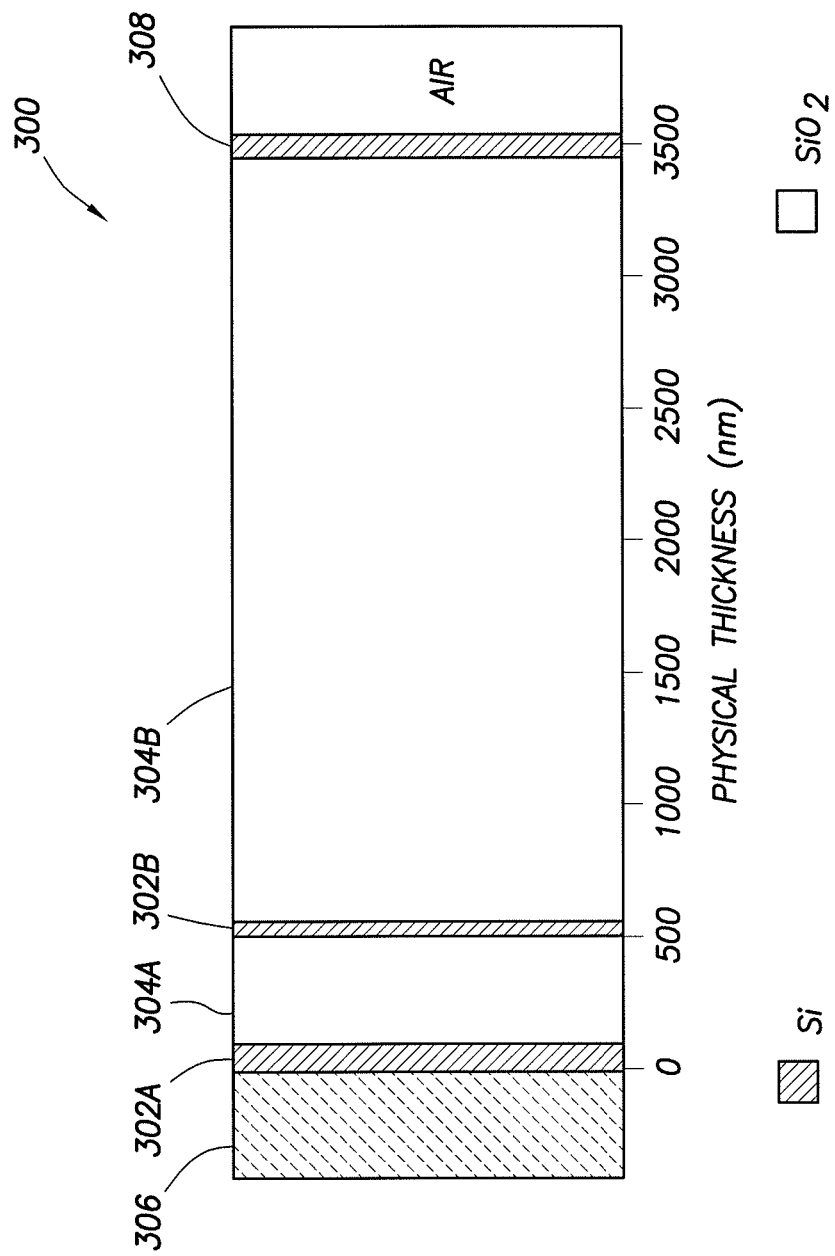
FIG. 3 depicts an ICE in accordance with an illustrative embodiment of the present disclosure.

An ICE structure in accordance with an illustrative embodiment of the present disclosure is shown in FIG. 3. The ICE structure 300 may be fabricated using the exemplary design optimization processes described herein. ICE structure 300 may include a plurality of alternating layers 302 and 304, such as, for example, silicon (Si) and quartz (SiO), respectively. The alternating layers may consist of any pair of suitable materials whose index of refraction is high and low, respectively. The film layers 302, 304 may be strategically deposited on an optical substrate 306. Specifically, a first film layer 302A may be deposited on the optical substrate 306. A second film layer 304A may be deposited on the first film layer 302A. In some embodiments, the optical substrate 306 may be BK-7 optical glass. In other embodiments, the optical substrate 306 may be other types of optical substrates, such as quartz, sapphire, silicon, germanium, zinc selenide, zinc sulfide, or various plastics such as polycarbonate, polymethylmethacrylate (PMMA), polyvinylchloride (PVC), diamond, ceramics, etc., as known in the art. The ICE 300 may include an end layer 308 at a distal end opposite the optical substrate 306 such that the film layers 302, 304 are positioned between the optical substrate 306 and the end layer 308. The end layer 308 may be exposed to the air surrounding the ICE structure 300. The number of film layers 302, 304 and the thickness of each individual film layer 302A, B and 304A, B may be determined from the spectral attributes acquired from a spectroscopic analysis of a property of the analyte being analyzed by the ICE using a conventional spectroscopic instrument.

The spectrum of interest of a given property of an analyte of interest may include a number of different wavelengths. It should be understood that the exemplary ICE structure 300 in FIG. 3 does not represent any particular property of a given analyte, but is provided for illustration purposes only. Consequently, the number of layers 302A-B, 304A-B and their relative thicknesses, as shown in FIG. 3, bear no correlation to any particular property of a given analyte. Moreover, the number of layers 302A-B, 304A-B and their relative thicknesses may be varied without departing from the scope of the present disclosure. Similarly, the materials that make up each layer 302, 304 may vary, depending on the application, cost of materials, and/or applicability of the material to the sample substance. For example, the layers 302, 304 may be made of materials including, but not limited to, silicon, quartz, germanium, niobium, niobium pentoxide, aluminum, aluminum oxide, combinations thereof, or other materials known to those with skill in the art having the benefit of this disclosure.

The multiple film layers 302A-B, 304A-B exhibit different refractive indices. By properly selecting the materials of the film layers 302A-B, 304A-B and their relative thicknesses and spacing, the exemplary ICE structure 300 may be configured to selectively pass, reflect, and/or refract predetermined fractions of light (i.e., electromagnetic radiation) at different wavelengths. Through the use of regression techniques, the corresponding output light intensity of the ICE structure 300 conveys information regarding a property of the analyte of interest. ICE structures with two to five film layers 302, 304 may be defined as simplified structures. A process may be implemented to select the optimal number and thicknesses of film layers to construct a simplified ICE structure (i.e., an ICE structure having 2-5 film layers 302, 304) for a particular environment.

Figure 4:
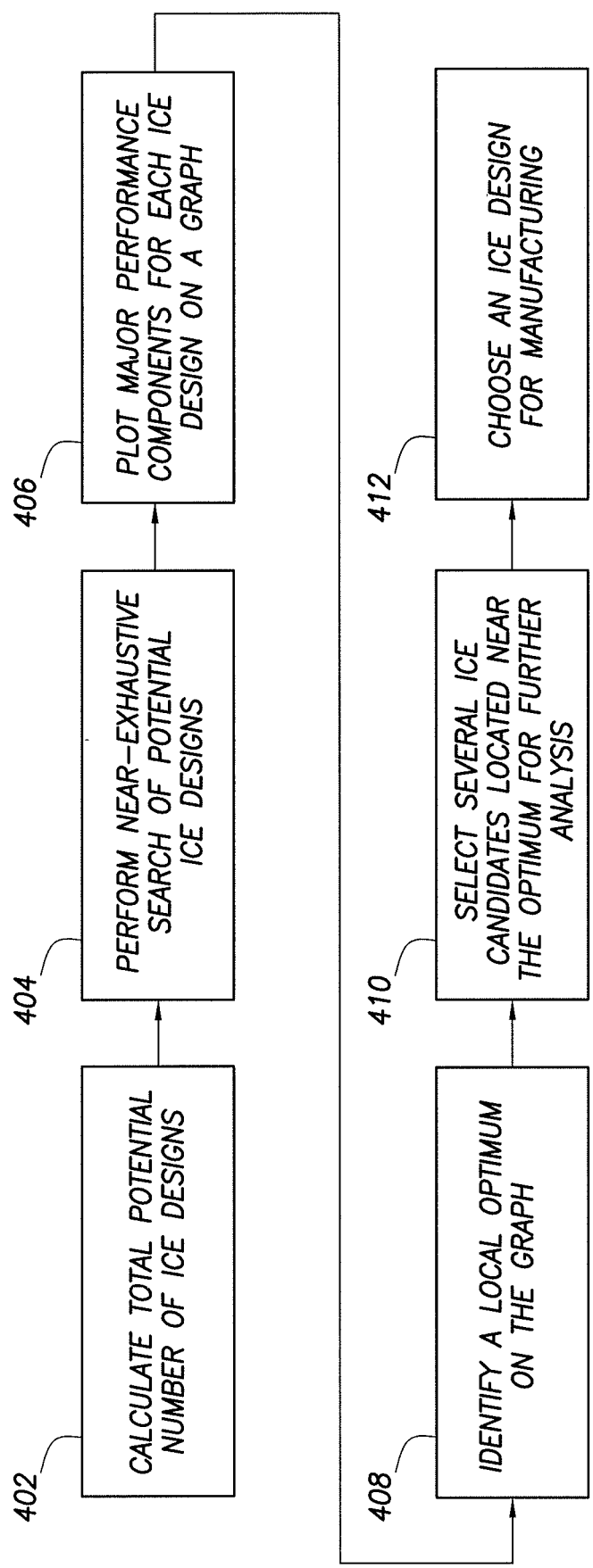
FIG. 4 depicts a flowchart of a method of designing an ICE in accordance with an illustrative embodiment of the present disclosure.

An illustrative process for designing an ICE 300 with a small number of film layers in accordance with an embodiment of the present disclosure is shown in FIG. 4. A user may start with ICE designs having only two film layers. At step 402, a user may calculate the total potential number of ICE design candidates. For example, assuming that the thickness for each film layer 302A-B, 304A-B may range from 20 nm-3000 nm with 150 possible thicknesses in that range, there are 150×150=22,500 possible ICE designs including all thickness combinations for an ICE with two film layers. The total potential range of thickness and the difference between each possible thickness for each film layer (i.e., the number of "steps") may be user-selected and may vary without departing from the scope of this disclosure. By varying the number of possible thicknesses for each film layer, the sensitivity (and thus, the cost) of the design method may be varied.

After the range and number of thicknesses for each film layer is determined, a near exhaustive design evaluation may be performed as shown in step 404 of FIG. 4. This includes performing a simulation analysis on each candidate ICE design. With only 22,500 designs to test, a user may calculate the performance components of each potential ICE design. In certain implementations, the information handling system 122 may be used to perform this analysis using ICE evaluation software. The major performance components of each potential ICE design may be analyzed by plotting them on one or more graphs in step 406 of FIG. 4. However, analyzing of performance components is not limited to plotting on graphs. For example, they may be analyzed using mathematical functions. The major performance components may include, but are not limited to, Standard Error of Calibration ("SEC"), Detector Output Sensitivity ("DOS"), and/or Percentage of Sensor Transmittance ("PST"). SEC refers to the root of the mean-squared error of the ICE prediction value compared to a target value or an actual measurement. DOS refers to the detector signal change per unit of target concentration change fitted with all calibration and validation samples. PST is a comprehensive measure associated with both the analyte transmittance spectra and the ICE transmittance spectra. The calculated percentage of sensor transmittance is averaged over the total number of calibration data points and discrepant wavelengths. At the design phase, a candidate ICE with a small SEC value but large DOS and PST values is desirable. However, these objective components often conflict with each other in any particular design. A graphic visualization including the performance components for a simplified ICE structure may provide a cost-effective means to help find the best trade-off among the competing components.

Figure 5A:
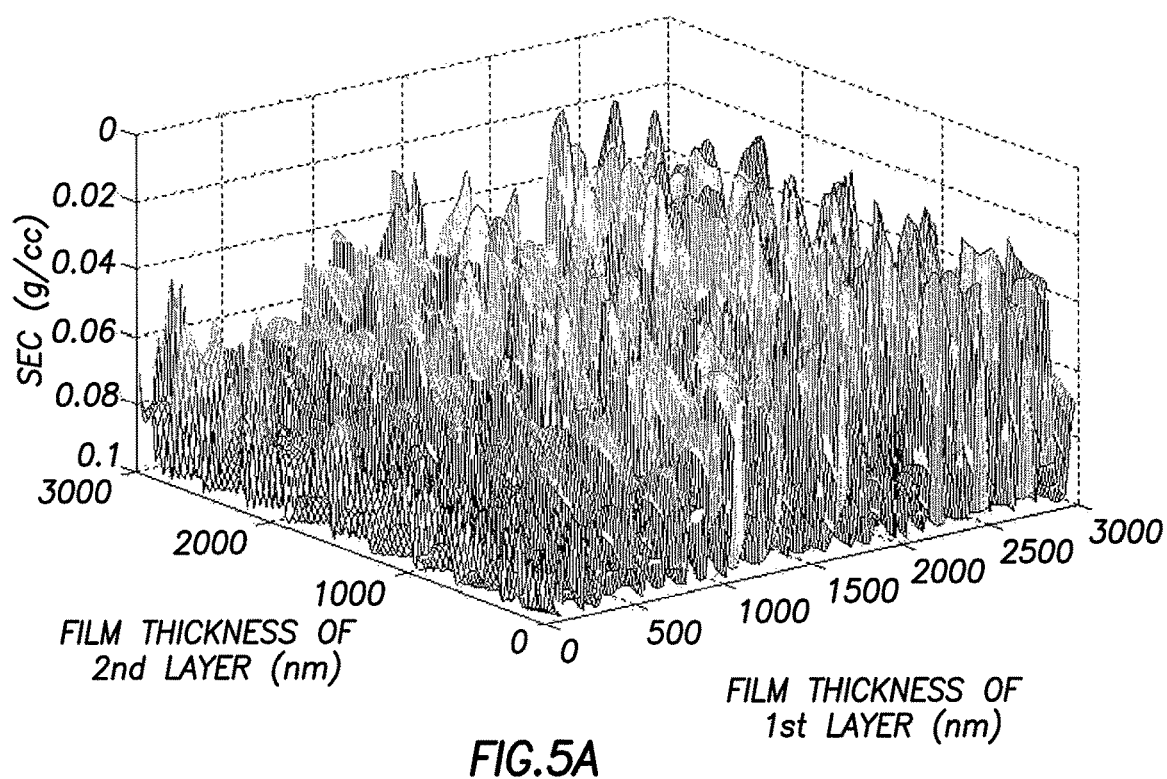
FIGS. 5A-5C depict the relationships among the major performance measures of an ICE in accordance with an illustrative embodiment of the present disclosure.
Figure 5B:
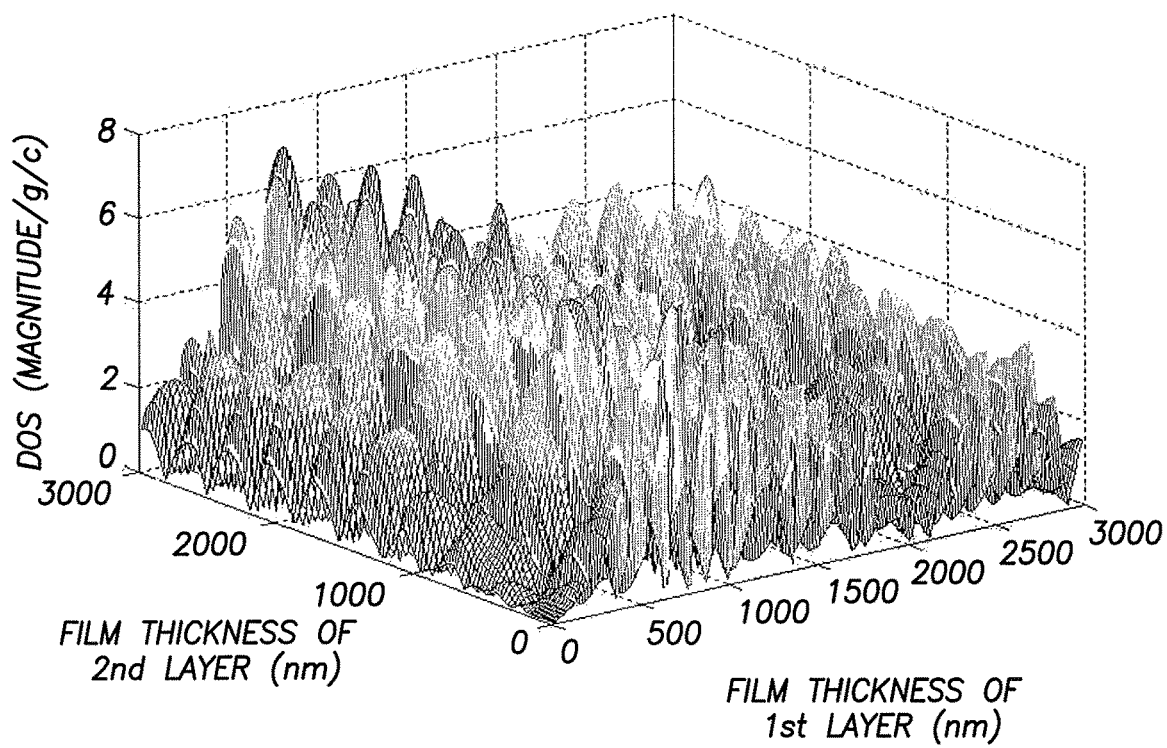
Figure 5C:
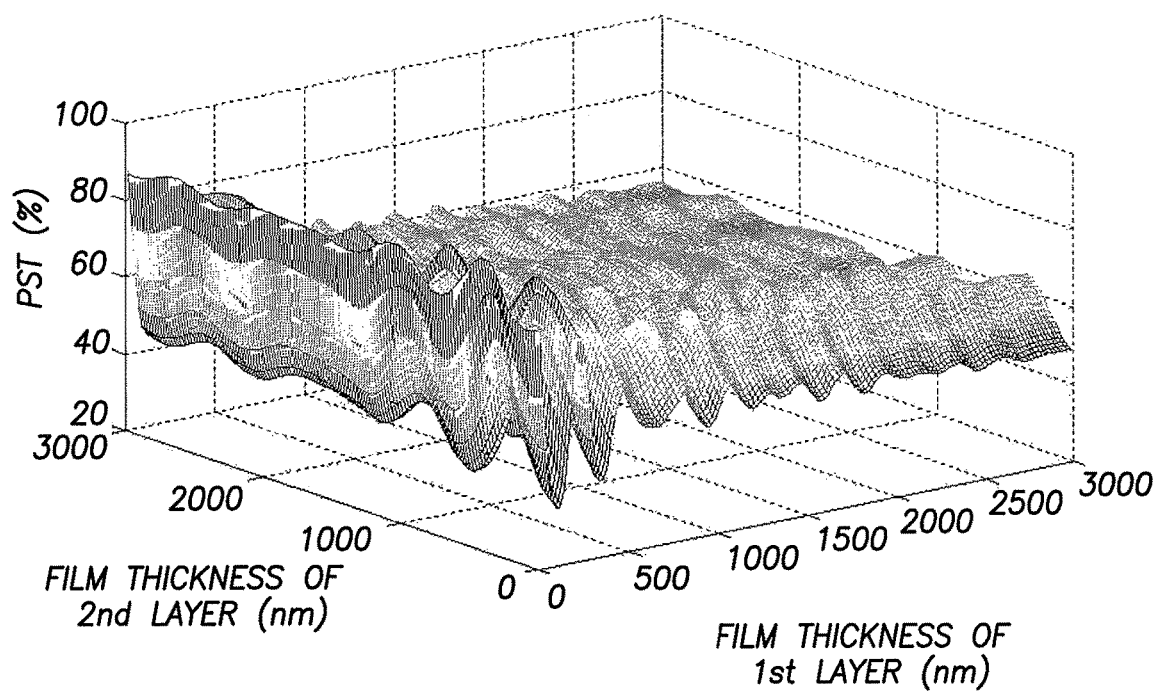

FIGS. 5A-5C depict illustrative graphs that may be prepared at step 406 in accordance with certain implementations of the present disclosure. For two-layer ICE designs, each performance component may be visualized as a function of layer thickness in a 3D plot. FIG. 5A shows SEC values on the z-axis of 22,500 different ICE designs versus the thicknesses of the first and second film layers for those ICE designs on the x- and y-axes. Various combinations of film thicknesses of the first and second film layers may be located on the x- and y-axes to find the SEC performance component on the z-axis for that particular two-layer ICE design. FIG. 5B shows DOS as a function of film layer thickness of the same two-layer ICE designs. Similarly, FIG. 5C shows PST as a function of film layer thickness of the same two-layer ICE designs. FIGS. 5A-5C show peaks for different film thickness combinations, reflecting that optimizing these three performance criteria often requires trade-offs.

Figure 6A:
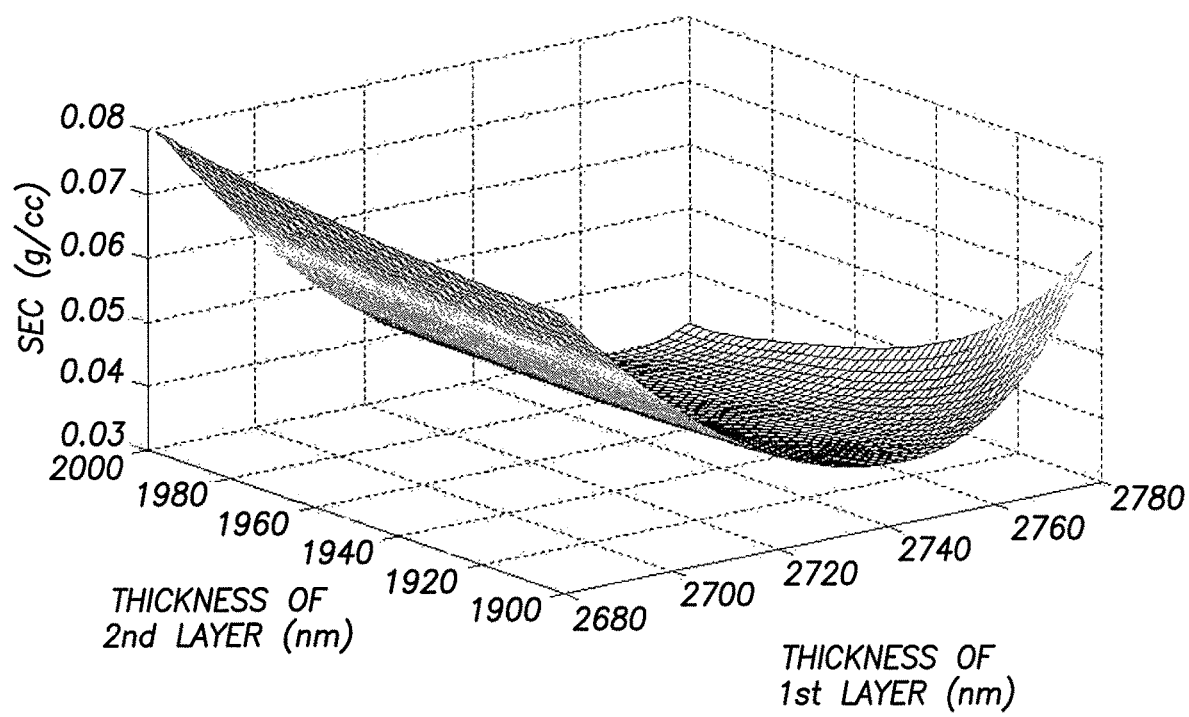
FIGS. 6A-6C depict performance sensitivity for various ICE designs in accordance with one embodiment of the present disclosure.
Figure 6B:
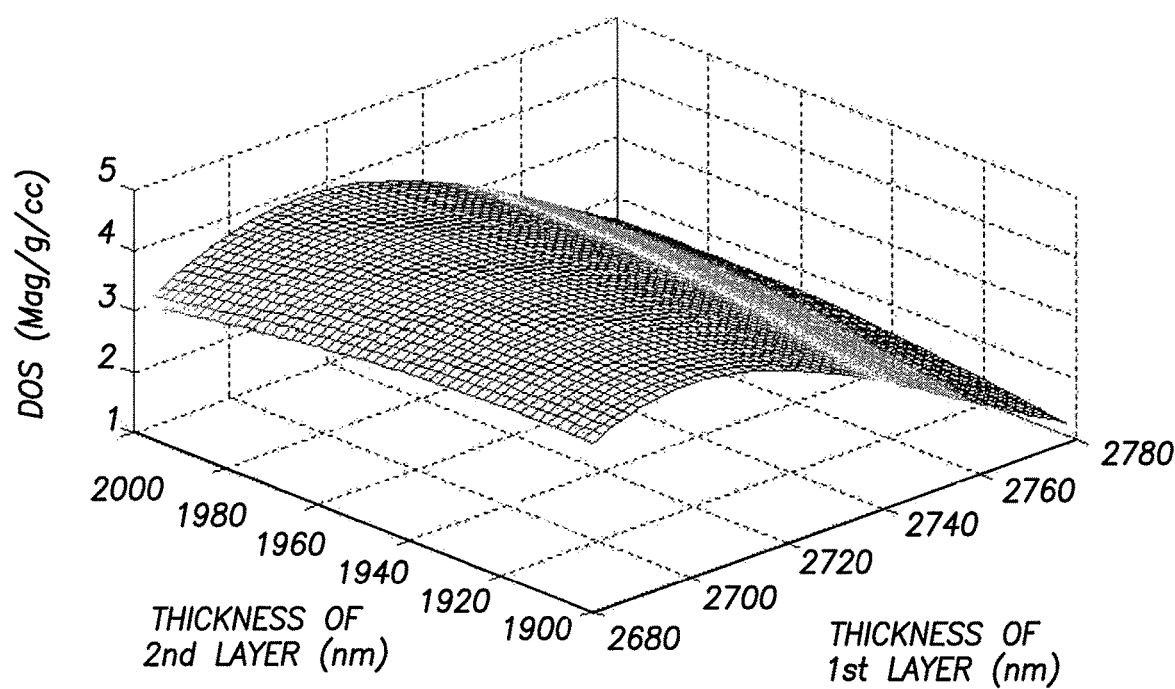
Figure 6C:
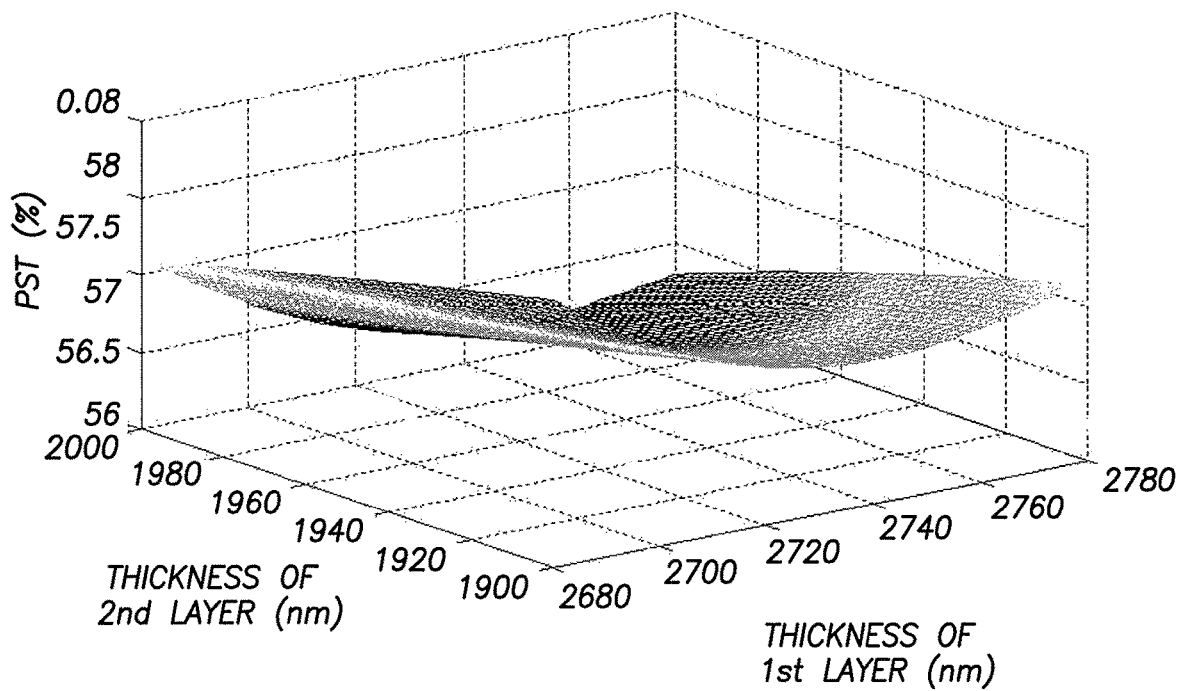

Returning now to FIG. 4, at step 408 the graphs (e.g., those shown in FIGS. 5A-5C) may be used to identify the ICE designs of interest within a particular boundary of film layer thickness. One or more local optimums, which may represent, for example, a minimum point for SEC and maximum point for DOS and PST, may be detected from each graph. The most promising ICE candidates, located near the optimum with balanced performance, may then be selected for further analysis at step 410. Using this method, there is no need to perform an iterative optimization. Performance measures of the selected ICE candidates may be graphed against a much smaller mesh grid, 1 nm, for example, to show performance sensitivity to a small change in layer thickness induced by environmental factors and manufacturing tolerance as shown in FIGS. 6A-6C. Specifically, FIG. 6A shows SEC sensitivity for the ICE designs, where the film thickness of the first layer ranges from 2680 to 2780 nanometers, and the film thickness of the second layer ranges from 1900 to 2000 nanometers. FIG. 6B and FIG. 6C are used to evaluate the DOS and PST sensitivity across the same film thickness ranges. It can be observed from these figures that PST is the parameter least sensitive to a change in the thickness of the film layers. DOS is more sensitive to a change in the first layer thickness than it is to a change in the second layer thickness over the selected range, and SEC shows a large variation with thickness change on both layers. Note that the ranges and examples depicted in FIGS. 6A-6C are presented for illustrative purposes only. They do not necessarily represent the best ICE candidate designs selected from FIGS. 5A-5C.

Returning again to FIG. 4, at step 412, the best ICE design candidate for fabrication may be selected using the sensitivity graphs (e.g., those shown in FIGS. 6A-6C). A good ICE candidate for fabrication may be one whose performance components are not sensitive to small changes of thickness in each film layer of the ICE. Using a near exhaustive design evaluation may minimize the chance of missing good ICE designs. It may also help reduce the computational cost associated with ICE design optimization in layer thickness selection. This process may be applied to multiple optimum points in determining the best candidate or candidates for manufacturing. The information handling system 122 may be used to perform the steps discussed herein in conjunction with FIG. 4. For instance, the information handling system 122 may prepare the initial graphs (i.e., graphs similar to that shown in FIGS. 5A-5C), prepare the sensitivity graphs (i.e., graphs similar to those shown in FIGS. 6A-6C), and perform the requisite analysis to select the best ICE design for manufacture.

As the number of film layers in the ICE design increases, 3 to 5 layers, for example, the thickness of each film layer may be controlled to a narrowed range since the total thickness of the ICE (including all film layers) is a limiting factor in ICE design. However, all potential ICE designs may still be graphed and ranked at rough grids first by properly selecting the number of potential thicknesses for each film layer and the range of total thickness for all film layers, followed by refined calculation at the vicinity of the best candidates of interest. To justify the feasibility of ICE designs with a small number of film layers, performance evaluation is made to compare the simulated ICE designs with a relatively large number of film layers that were made using a conventional approach to the simulated ICE designs with a small number of film layers made using the methods in this disclosure.

Figure 7A:
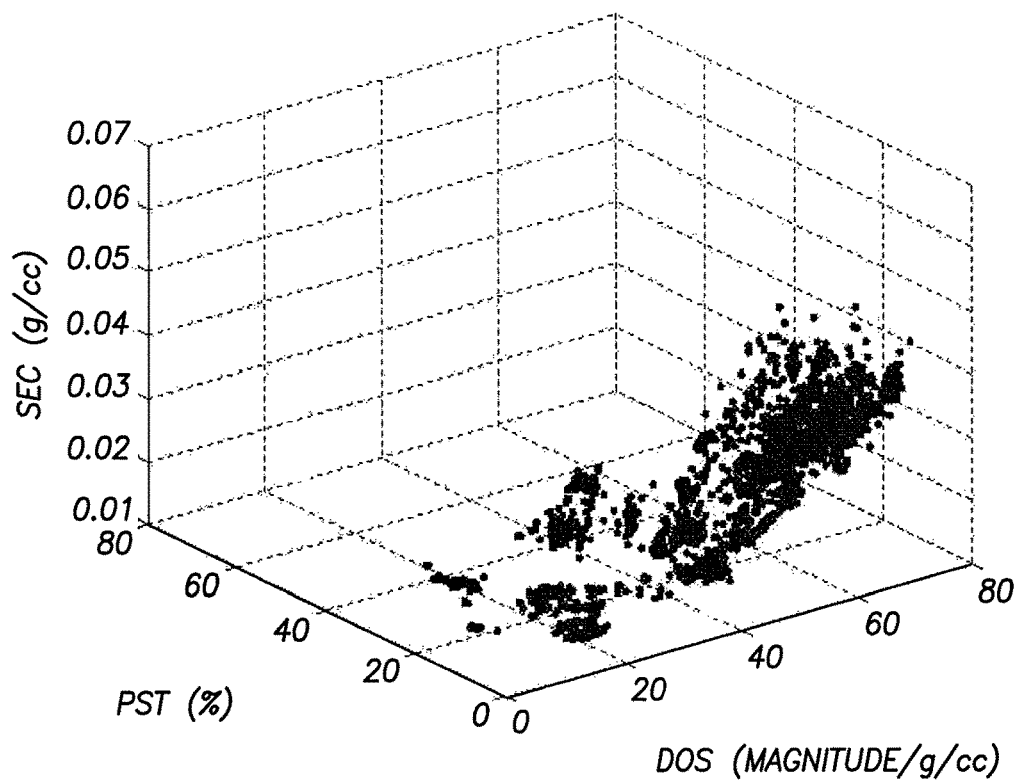
FIGS. 7A-7B depict performance profiles of different ICE designs in accordance with one embodiment of the present disclosure.
Figure 7B:
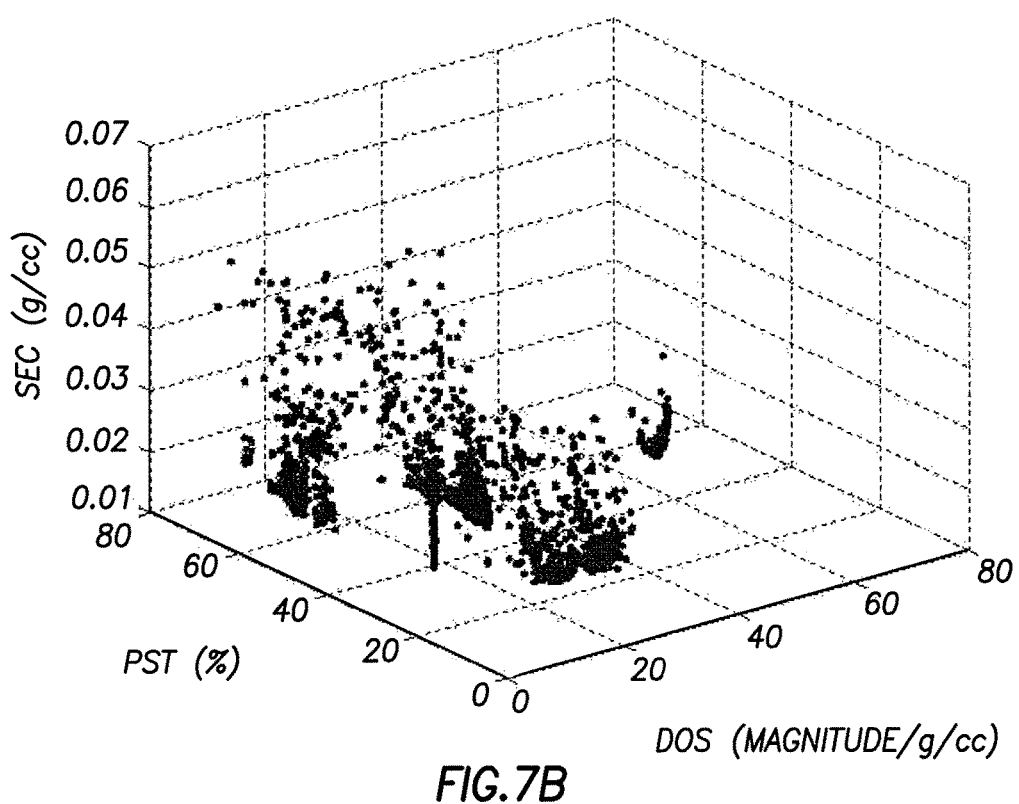

FIG. 7A shows performance measures (SEC, DOS and PST) of thousands of simulated ICE designs with a large number of film layers, and FIG. 7B shows the same measurements of simulated designs with a small number of film layers (characterized with higher PST and lower DOS). It may be concluded from these plots that the ICE designs with a larger number of film layers are characterized with higher DOS and lower PST, while the designs with a small number of layers are featured by higher PST and lower DOS. The SEC, which is often selected as the top criterion for ICE design, is about the same level for both approaches. Note that "lower" and "higher" in DOS and PST measurements with a large and small number of film layers are only relative to each other and both methods may provide comparable satisfaction in ICE performance. However, using a small number of layers has distinct advantages regarding cost reduction in both design and manufacturing, which will be described in more detail later. This disclosure provides significant advantages to ICE applications.

Design of a simplified ICE may include a design phase as well as a fabrication/manufacturing phase, followed by system implementation. During the ICE manufacturing process, manufacturing error may be introduced. The manufacturing process is nevertheless deemed acceptable if the manufacturing error value is controlled within a certain tolerance. However, since the manufacturing error causes the actual thickness on each layer to be different from its theoretical value, it may cause drift of the ICE transmittance spectrum and may lead to performance degradation. To minimize these negative effects, it is desirable during manufacturing of a particular film layer to be able to predict and control the thickness of the next film layer to be deposited in order to minimize the change of ICE transmittance spectrum, given the actual thicknesses of existing film layers.

In accordance with certain embodiments of the present disclosure, an ICE database simulated with ICE designs having a small number of film layers may be used to develop models for a neural network inversion of ICE transmittance spectra. Each model may be used to predict a thickness of a particular layer of interest by using the available information about the theoretical ICE transmittance spectrum and other layer thicknesses as inputs.

Figure 8A:
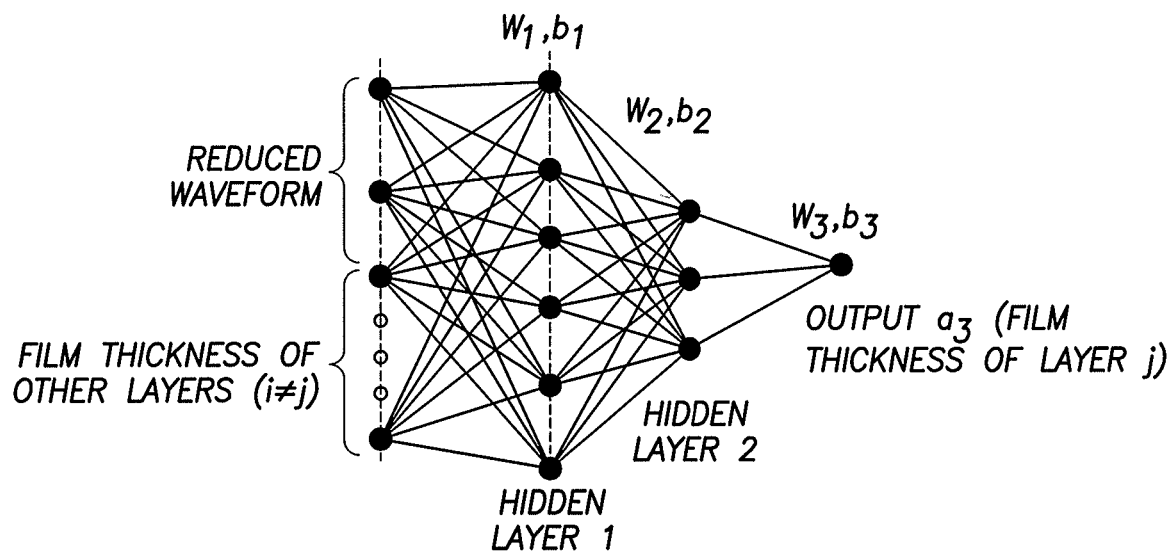
FIG. 8A depicts a model structure of an artificial neural network in accordance with one embodiment of the present disclosure.

A method for fabricating a simplified ICE includes predicting an optimal thickness of each film layer using a neural network. Turning now to FIG. 8A, a basic model structure implementing a neural network in accordance with certain embodiments of the present disclosure is shown. An artificial neural network is a powerful non-linear modeling platform used for function approximation. In this embodiment, different neural network models may be developed to predict the thickness of each particular film layer of interest, respectively, during the fabrication/manufacturing phase. As shown in FIG. 8A, an inverse model may be trained using a set of inputs. The inputs may include 1) a set of theoretical ICE transmittance spectra; 2) the thicknesses of other film layers that have already been manufactured; or 3) the simulated thicknesses of film layers to be deposited in the future. The theoretical ICE transmittance spectra are typically measured over more than 1000-nanometer intervals in wavelength, and they may lead to the presence of too many input parameters if measurements from each nanometer step (typically, 1 nm resolution in ICE design) are treated as independent input variables. To reduce the number of input parameters, ICE spectra are sampled with less density in wavelength. For instance, in one illustrative embodiment, 10 nanometers may be used as the increment for each step. In another example, Principal Components Analysis (PCA, a multivariate mathematic procedure to decompose a set of observations), and reduced spectra parameters may also be used as inputs to the neural networks.

Other inputs into the neural network may include the film thicknesses of other layers in the ICE. The thicknesses of other layers may include the actually measured values for layers that have already been manufactured or the theoretical design values for layers that have not yet been manufactured. In one illustrative embodiment as shown in FIG. 8A, the model architecture adopted for layer thickness prediction may be a two-hidden-layer neural network with 10 nodes on the first and second hidden layer as default (other settings may be used), respectively. The transfer function used on each hidden layer may be a hyperbolic tangent sigmoid function, and on the output layer a linear function. In computation, the neural network model feeds an input vector forward though multiple layers to calculate output as expressed in Eqs. (1) to (3) below, where $W_1$, $b_1$, $W_2$, $b_2$ and $W_3$, $b_3$ are the connecting or weighting matrices or vectors determined by the Bayesian Regularization training algorithm, and $n_1$, $n_2$, $n_3$, $a_1$, $a_2$ and $a_3$ are net inputs and outputs at different layers. The Bayesian Regularization training algorithm is recited for illustrative purposes only and other training algorithms may be used without departing from the scope of the present disclosure.

$$a_1 = f_1(n_1) = \frac{e^{n_1} - e^{-n_1}}{e^{n_1} + e^{-n_1}}, n_1 = W_1 \times P + b_1 \quad (1)$$

$$a_2 = f_2(n_2) = \frac{e^{n_2} - e^{-n_2}}{e^{n_2} + e^{-n_2}}, n_2 = W_2 \times a_1 + b_2 \quad (2)$$

$$a_3 = f_3(n_3) = n_3, n_3 = W_3 \times a_2 + b_3 \quad (3)$$

Figure 8B:
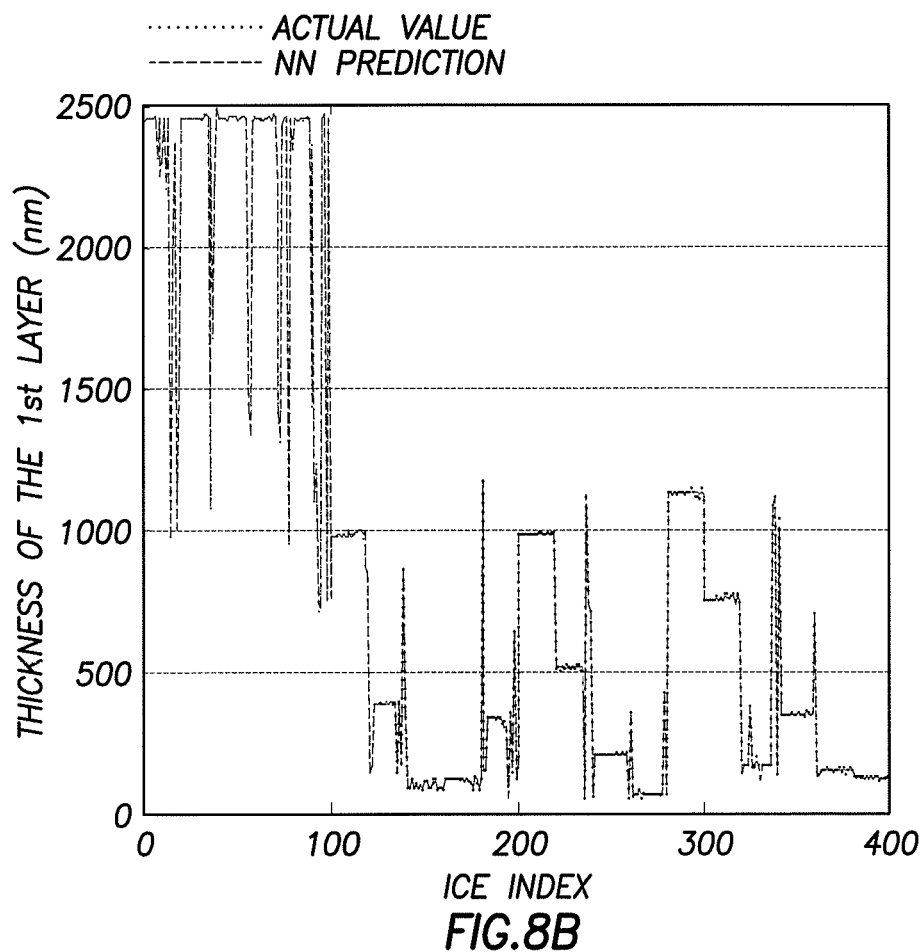
FIGS. 8B-8D depict comparisons between neural network predictions and the actual thickness of three layers of an ICE in accordance with one embodiment of the present disclosure.
Figure 8C:
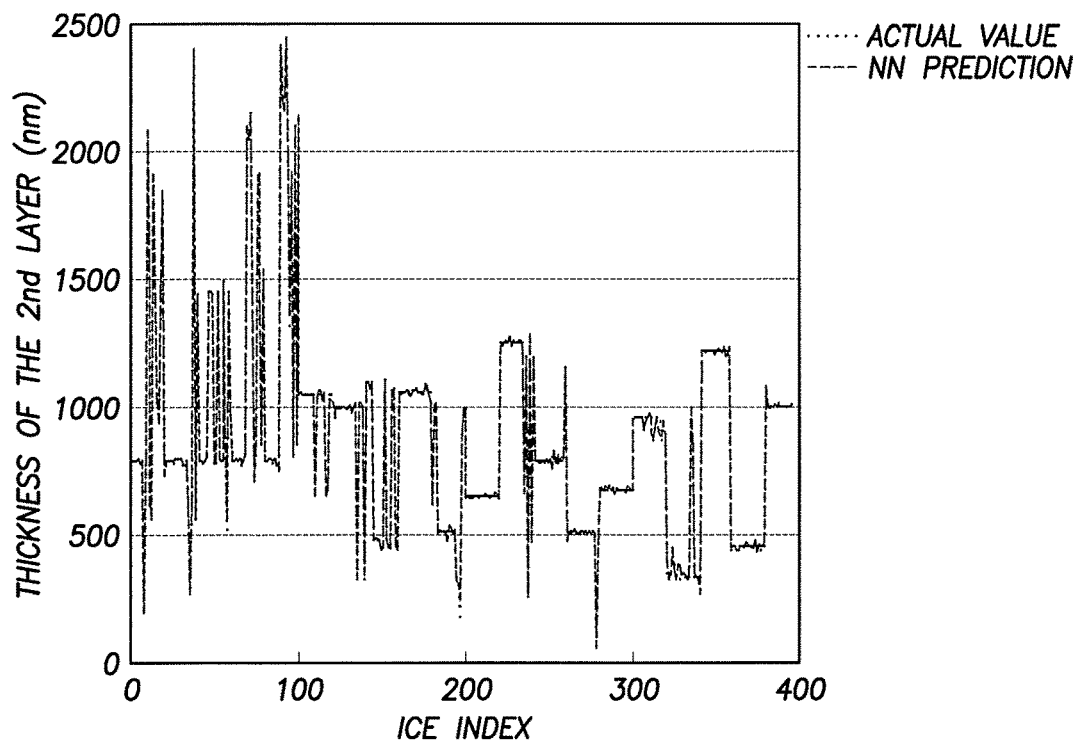
Figure 8D:
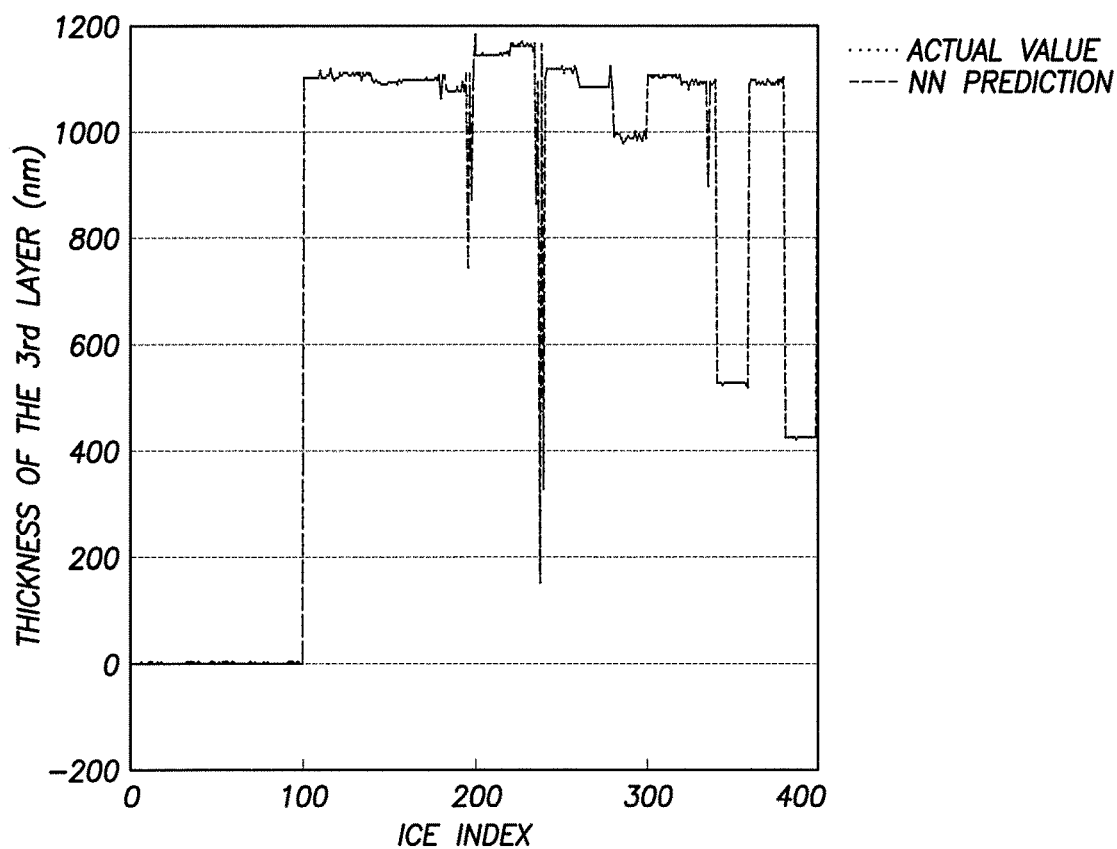

Note that although the same neural network architecture may be used for various ICE designs, the predictive models are layer-dependent. Different models must be developed in predicting the thickness on different layers. It is an advantage that only a small number of inverse models are needed by using an ICE database with a small number of film layers. FIGS. 8B-8D compare the neural network predictions and the actual thickness of three layers of 400 ICE designs in a database. Specifically, in each of the FIGS. 8B-8D, graphs are depicted where the x-axis denotes the ICE index and the y-axis notes the thickness of the first film layer (FIG. 8B), the thickness of the second film layer (FIG. 8C), and the thickness of the third film layer (FIG. 8D), respectively. The term "ICE index" as used herein is a numeric naming mechanism to refer to the various ICEs being studied (for example, ICE #1, ICE #2, etc.). Because the predictions are so accurate, the inverse method disclosed herein may be useful for quality control of ICE fabrication by setting dynamic target values of layer thicknesses during the process of material deposition.

Although fabricated ICEs may meet design requirements using the embodiments described herein, the use of a single ICE still may have limited application because of the inherent limited capacity of an individual element and the uncertainty that might be induced during and after fabrication. To overcome this limitation, multiple ICEs may be combined in a calibration system to form an ICE combination. The ICE combination may be better suited to evaluate single or multiple properties of an analyte of interest. Additionally, fabricated ICEs or an ICE combination may be recalibrated after fabrication to compensate for manufacturing and environmental factors. In one embodiment, example ICE designs from an ICE database may be used to construct a candidate pool, and a genetic algorithm may be used to optimize member ICE selection based on the system and tool limits.

A genetic algorithm is a stochastic global search engine that mimics natural biologic evolution. Genetic algorithms operate on a population of potential solutions and apply the principle of survival of the fittest to produce improved solutions through multiple iterations, or generations. At each generation, the fitness of each individual solution is evaluated based on a user-defined objective function, and an updated population of individual solutions are created by using genetic operators such as ranking, selection, crossover, and mutation. This evolutionary computation approach eliminates the need to calculate the first derivative and/or the second derivative (as is done in conventional optimization methods) and is suitable to solve complex problems such as selection of multiple ICE candidates to be used in combination for a system implementation. In certain embodiments, the genetic algorithm may be implemented using the information handling system 122.

Figure 9:
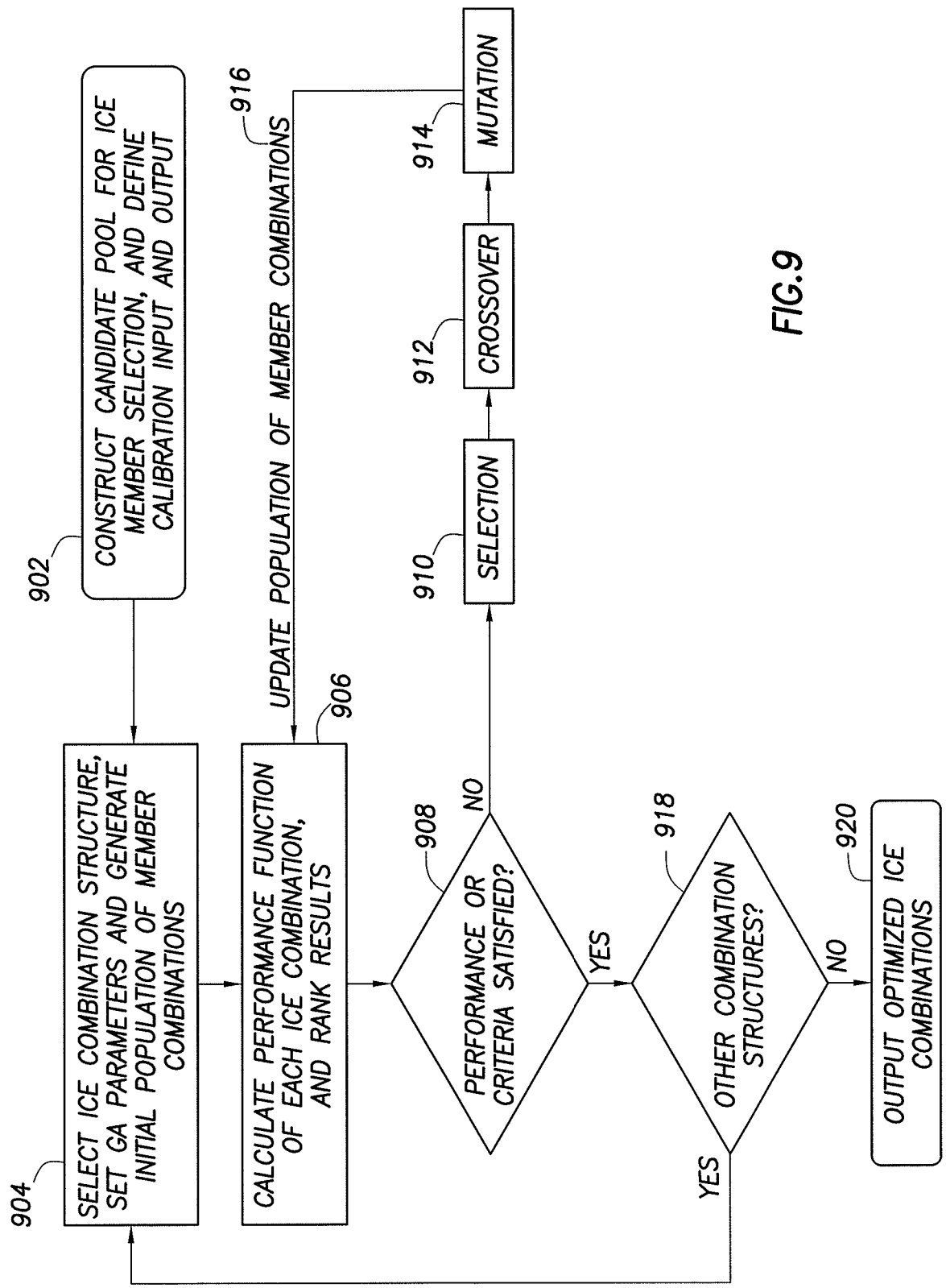
FIG. 9 depicts a flowchart of a method in accordance with one embodiment of the present disclosure.

FIG. 9 shows a flow chart that may be used with a genetic algorithm to select multiple ICEs from an established database (an ICE database developed with a small number of film layers, for example) to be used in combination for calibration analysis. First, at step 902, an ICE candidate pool is generated with all detector responses calculated. An ICE detector response is typically calculated as a dot product of a system-convoluted ICE spectrum and analyte spectrum, and used as the input of a calibration model. The term "analyte spectrum" refers to the measured spectrum of the selected sample, which is usually obtained under standard laboratory conditions and spans over a wide wavelength range. The output of a calibration model is usually the analyte property of interest.

Still referring to FIG. 9, next, at step 904, a user may specify the desired number of ICE elements to be used in combination. For example, if a 5-ICE combination is specified, the objective of the process would be to find the best five ICE candidates from the database to minimize a calibration error on the selected sample analytes. The number of ICE designs in the database is an empirically selected number in the form of $2^n$, such as 64, 128, 256, 512, 1024, or 2048. For example, if 2048 previously-ranked ICE designs are available in the database, selecting each of the 5 ICEs becomes an optimization problem with each of the 5 ICE members being a design parameter ranging from 1 to 2048. The genetic algorithm will randomly initiate a population of different 5-ICE combinations and put them into a calibration routine. The population size (assume, e.g., 500 as a default for this example) may be set as an operational parameter and used in conjunction with the other genetic algorithm parameters to control the diversity in the solutions and improve the computation efficiency.

Next, at step 906, for each ICE combination, the performance function is calculated based on the calibration analysis. Note that the performance function used in an ICE combination selection is different from the performance function used in selecting an individual ICE design as described previously. To optimize the individual ICE design, a multi-objective function is selected in order to find the best trade-off among SEC, DOS, and PST. In ICE combination selection, however, the SEC (root of mean-squared error, for example) may be the only measure used in a performance calculation. That is, the selection may occur based on the results of using only one performance function. In one embodiment, the detector response of each ICE in a combination set may be used in conjunction with other ICE members' responses in the set as inputs for a PLS (Partial Least Squares) multivariate regression analysis. The calibration with inputs from 5 ICE detector responses, for example, may result in a linear regression vector to calculate the standard error of calibration compared to the actually measured property of an analyte. After the calibration results of all ICE combinations in the initial population are obtained, ranking may be performed.

At step 908, a determination may be made as to whether the performance measures satisfy predetermined criteria. If not, the ranked performance measures may be used to update the ICE combination selection through steps 910, 912, 914, and 916 in multiple generations until the predetermined criteria are met. Alternatively, the number of generations, or inner loop iterations, may be predefined as an operational parameter, such as 300 generations, to control the termination of the process of optimization. Step 918 and the outer arrow loop will apply if the system is required to investigate the feasibility or compare the calibration results with various ICE combination structures with different numbers of ICEs in each set. Finally, optimized sets of ICE combinations are outputted at step 920.

Note that the process for ICE combination selection shown in FIG. 9 is applied to the design phase before the ICE elements are fabricated. Once the theoretical ICE database is established, this process may also be used as a general multiband-filter base for different applications. In some embodiments, ICE combination selection may be optimized to minimize the calibration error on the same property of an analyte used for candidate ICE designs. This may be referred to as an ICE object-oriented application. In other embodiments, ICE combination selection may be optimized to minimize the calibration error on multiple properties, including those not used in original ICE designs. This may be referred to as an ICE multiband-filter application. In both cases, the optimized ICE members in combination typically exhibit diversity in both the number of layers and their thicknesses.

As noted above, one or more of the steps of the methods disclosed herein may be performed using the information handling system 122 with machine-readable instructions without departing from the scope of the present disclosure. For instance, like the methods depicted in FIGS. 4 and 5, the method steps of FIG. 9 may be implemented using the information handling system 122.

Figure 10A:
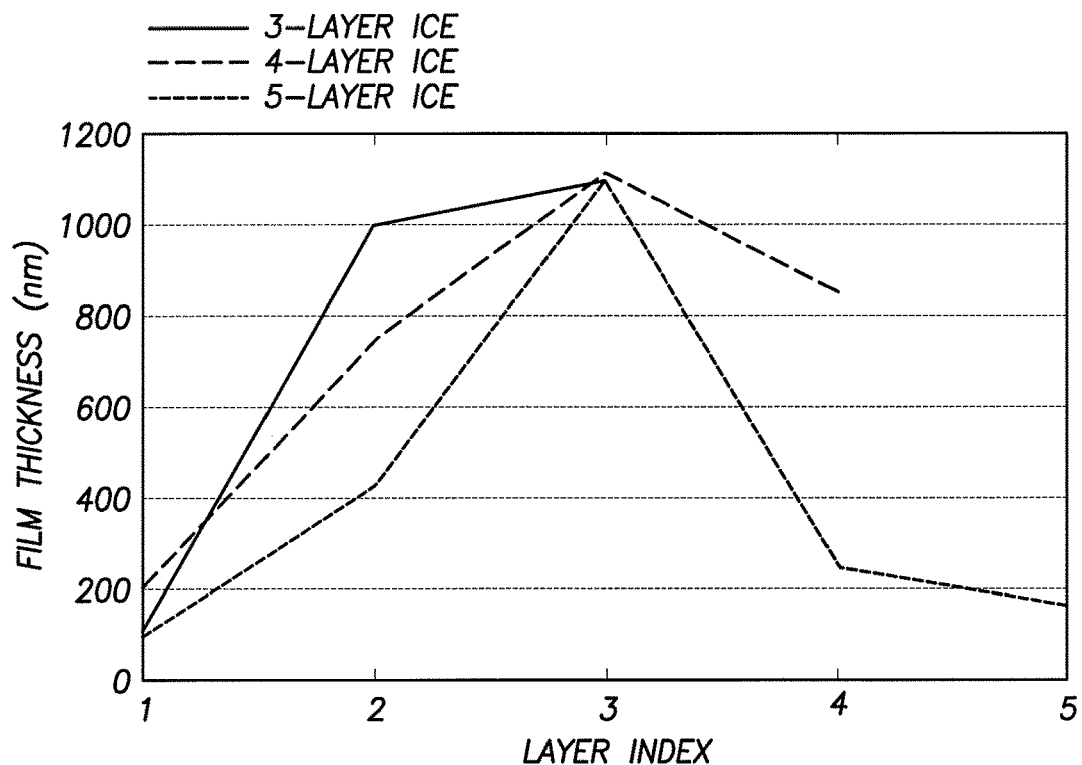
FIG. 10A depicts thicknesses of multiple layers of an optimized ICE combination that includes three ICE members with 3 layers, 4 layers and 5 layers.
Figure 10B:
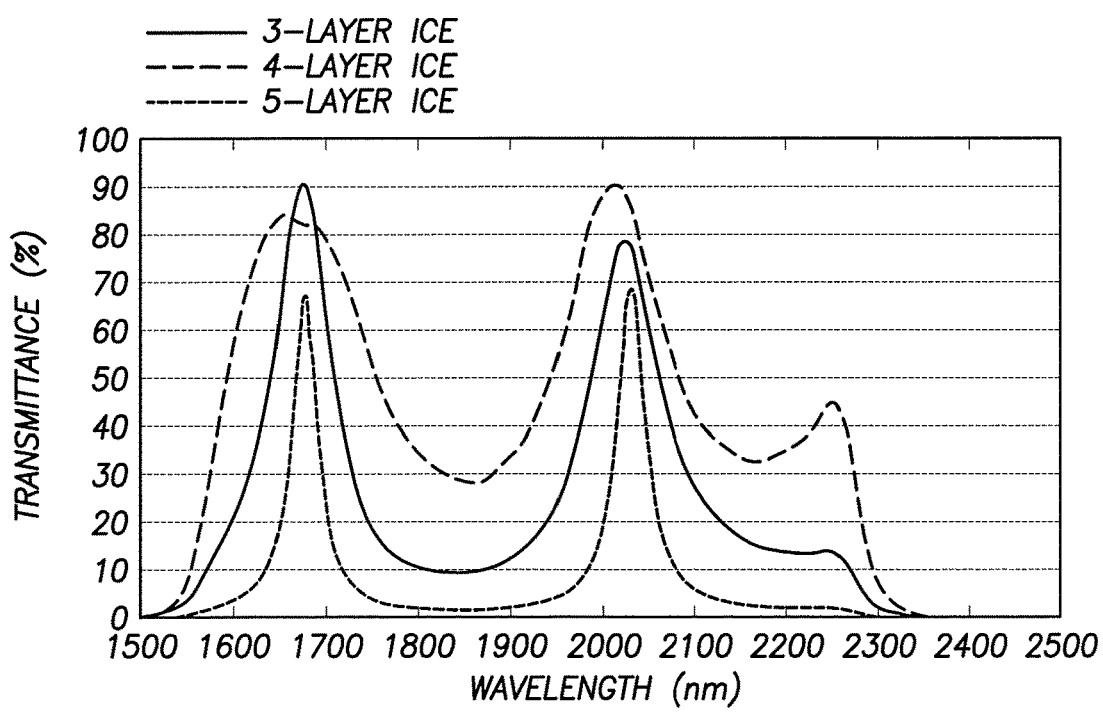
FIG. 10B depicts the system convoluted transmittance of the example ICEs shown in FIG. 10A.
Figure 10C:
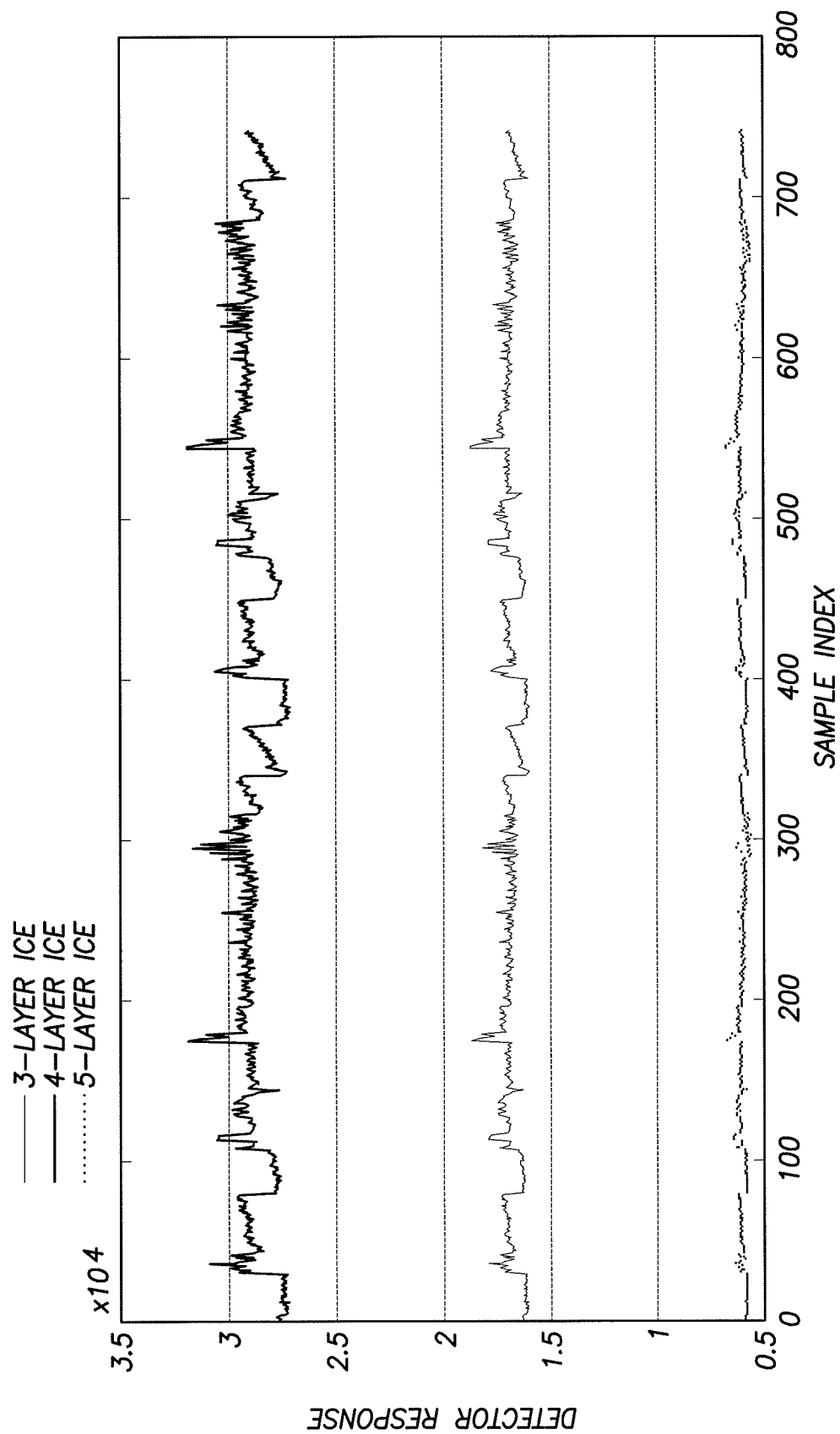
FIG. 10C shows the detector response of each ICE shown in FIG. 10A over 750 samples.

FIGS. 10A-10C illustrate an example to show the features of an ICE combination for an object-oriented application.

FIG. 10A shows the multiple layer thicknesses of an optimized ICE combination that includes three ICE members with 3 layers, 4 layers and 5 layers, respectively. The number of film layers included in an ICE (i.e., "Layer Index") is plotted on the x-axis versus the corresponding film thickness of each film layer, shown on the y-axis. It can be observed from FIG. 10A that the layer thicknesses of the selected ICE elements are similar on the third layers, but different on the second layer. The thickness curve for the 3-layer ICE does not extend to the fourth layer and fifth layer because these layers do not exist. For the same reason, the thickness curve of the 4-layer ICE does not extend to the fifth layer. The difference in ICE structures can lead to variation of optical response for each ICE included in an ICE combination.

FIG. 10B displays the system convoluted transmittance of the ICEs of FIG. 10A. The wavelength in nanometers of the electromagnetic radiation passing through an ICE design is plotted on the x-axis versus the percentage transmittance, or percent of electromagnetic radiation that passes through (and doesn't get reflected or refracted from) the ICE on the y-axis. It can be observed from FIG. 10B that given member transmittance spectra have close center wavelengths for multiple bands, mainly because they are used to detect the same property of an analyte. However the bandwidth and transmittance of each ICE may be different, which will affect detector response once it interacts with sample spectra. FIG. 10C shows the scaled detector response of each ICE over 750 samples which is the dot product of sample spectra (not shown) and the ICE convoluted spectra given in FIG. 10B. Note that the individual ICE in the committee may not exhibit the best performance when used alone. Once used in combination, the difference in multi-ICE detector responses can help form effective regression inputs to minimize the calibration error.

Figure 11A:
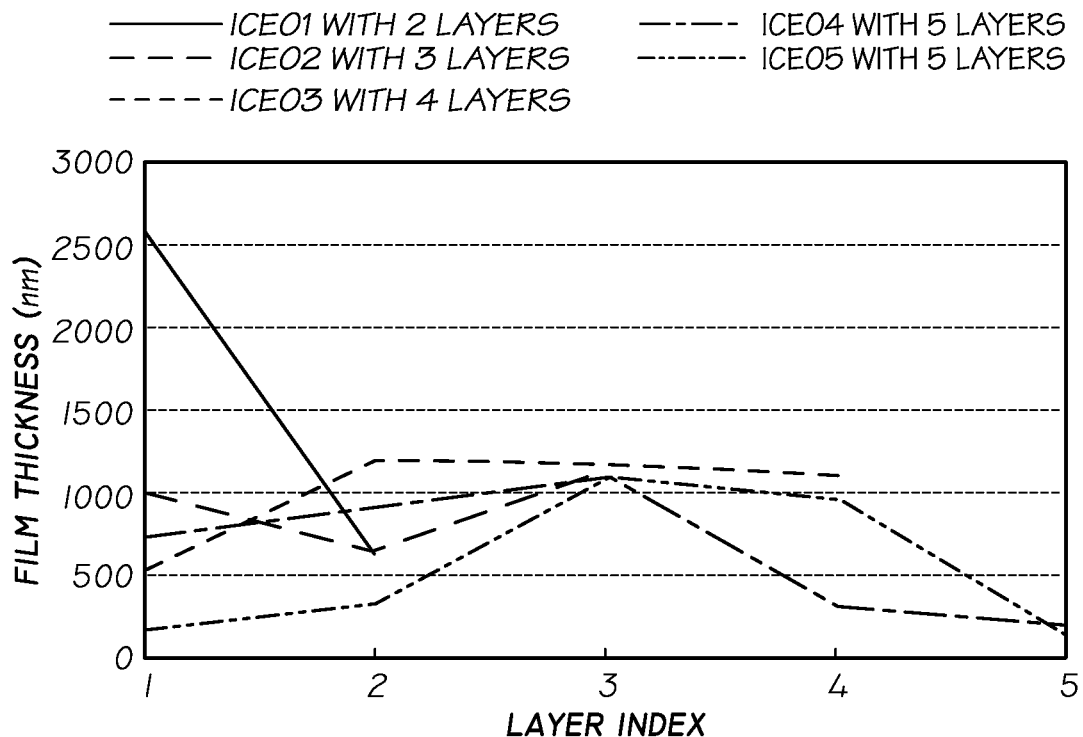
FIG. 11A depicts layer thicknesses versus corresponding layers of five ICEs.
Figure 11B:
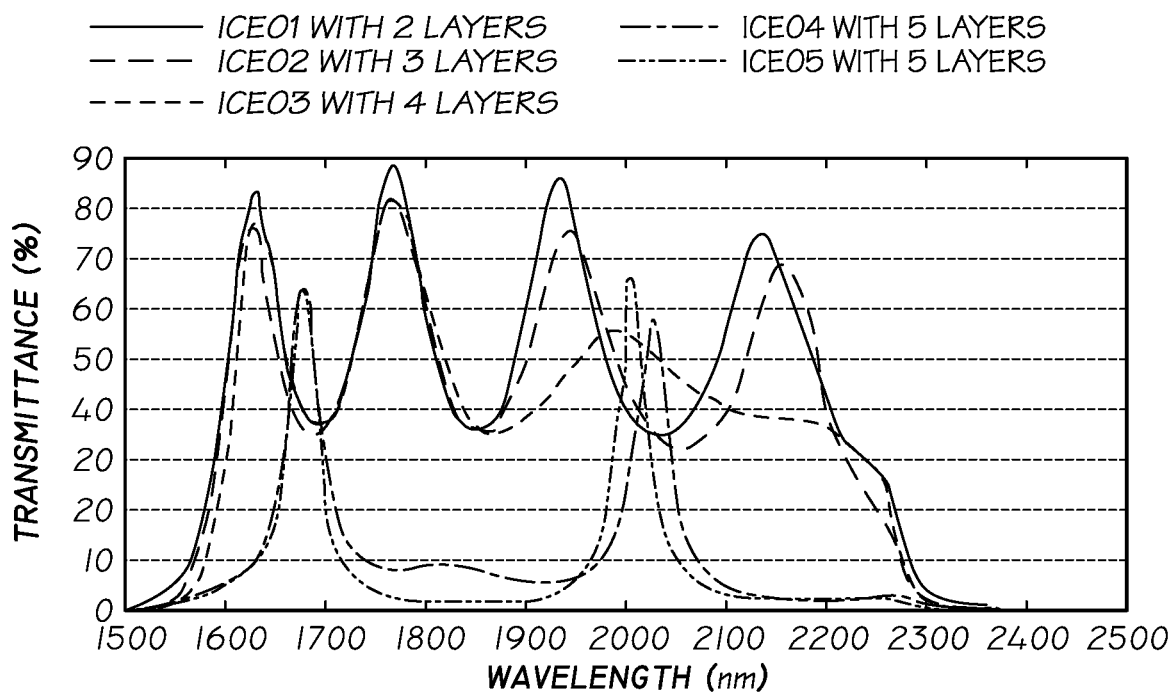
FIG. 11B depicts the system convoluted transmittance of the example ICEs shown in FIG. 11A.

FIGS. 11A-11B present an example to show the features of ICE combination for a multiband-filter application. The number of film layers included in an ICE (i.e., "Layer Index") is plotted on the x-axis versus the corresponding film thickness of each layer, shown on the y-axis. Although a theoretical ICE base might be simulated to predict the property of a particular analyte, ICE combination selection from the same ICE base may be optimized to minimize the calibration error on multiple properties including those not used for the originally-selected ICE designs. FIG. 11A shows layer thicknesses versus corresponding layers of five ICEs selected for this purpose. FIG. 11B displays their convoluted transmittance spectra. The wavelength in nanometers of the electromagnetic radiation passing through an ICE design is plotted on the x-axis versus the percentage transmittance, or percent of electromagnetic radiation that passes through (and doesn't get reflected or refracted from) the ICE on the y-axis. In order to provide good predictions on multiple properties of samples using a combination of ICEs as inputs, the spectra of selected ICE members need to cover a wide bandwidth generated with more diverse ICE structures as seen from the 2 layers to 5 layers in this example. FIG. 11B shows that two 5-layer ICE spectra have peaks located at different center wavelengths compared to the peaks of other ICE spectra. Even though they have the same 5 film layers, the two spectra have shifted second peak locations due to the different thicknesses at the first layer, second layer, and fourth layer as shown in FIG. 11A. The ICE database simulated with a small number of film layers is capable of providing the required member ICE candidates with diverse transmittance profiles and may be used as a general multiband-filter base for multi-property prediction even though the original designs are generated for single property evaluation. This distinctive feature can be further demonstrated through recalibration after fabrication.

After fabrication, ICE recalibration is often needed to compensate for any characteristic changes induced during fabrication and to adjust the number of elements used in combination due to hardware and tool limitations. Recall that during ICE combination selection, member ICEs were selected from a candidate pool with a large number of designs available, and PLS regression was used to make the optimization loop efficient. Recalibration after fabrication is applied to actual ICEs with limited choices on member selection but with more options on calibration algorithms including non-linear neural networks and others. The advantage of using a neural network for recalibration on an ICE combination is its flexibility and robustness in dealing with member elements' nonlinear feature shifting that might be serious and hard to compensate with conventional linear calibration. FIG. 12A compares a neural network prediction with target concentration of empiric training and validation samples using detector responses of 3 ICEs applied to the same example as shown in FIG. 10C. FIG. 12B shows a prediction on a chemical concentration different from the original ICE design using a neural network model recalibrated with the same responses of 5 ICEs as shown in FIGS. 11A-11B. More ICEs might be needed in combination if the same set of elements is required to analyze more physical and chemical properties of interest. ICEs may also be used in conjunction with other optical filters for calibration analysis. Alternatively, one or more ICEs in the ICE combination may be switched out.

One or more of the method steps depicted in FIGS. 10A-C, 11A-B, and/or 12A-B may be performed using the information handling system 122 with machine-readable instructions.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A method for fabricating a simplified ICE having two or more film layers, comprising:
    training a layer-dependent neural network based on at least one of a set of theoretical ICE transmittance spectra, a thickness of a manufactured film layer and a simulated thickness of two or more film layers to be deposited, wherein the neural network comprises at least a two-hidden-layer neural network, and wherein a transfer function is used on each hidden layer of the neural network;
    predicting an optimal thickness of each of the two or more film layers of the simplified ICE using the neural network;
    determining a thickness and a number of possible thicknesses for each of the at least two film layers, wherein the number of possible thicknesses for each of the at least two film layers varies, wherein the neural network predicts optimal thicknesses for ICE film layers to be deposited, and wherein predicting the optimal thickness of a film layer of the two or more film layers is based, at least in part, on an actual thickness of one or more previous film layers and a simulated optimal thickness for one or more subsequent film layers, wherein the actual thickness comprises a first thickness of a first film layer and a second thickness of a second film layer, wherein a number of ICE design candidates comprises a number of ICE design candidates, and wherein the number of ICE design candidates comprises a set of ICE candidates calculated based on one or more combinations from a plurality of variable ranges including a first specified range of the first thickness and a second specified range of the second thickness;

setting a dynamic target value for a film thickness for each of the two or more film layers during material deposition using the predicted optimal thickness to minimize manufacturing error in the film thickness for each of the two or more film layers;

selecting the simplified ICE from the number of ICE design candidates for fabrication based, at least in part, on a refined simulation analysis, wherein the simplified ICE comprises a first film layer thickness of the first specified range of thicknesses and a second film layer thickness of the second specified range of thicknesses; and fabricating the simplified ICE, wherein fabricating the simplified ICE comprises a depositing a material in a layer based, at least in part, on the dynamic target value for the film thickness for each of the two or more film layers.

2. The method of claim 1, wherein the predicting the optimal thickness of each of the two or more film layers of the simplified ICE using the neural network comprises:

using a neural network to build a layer-dependent predictive model;

training the layer-dependent predictive model using one or more parameters as inputs to the layer-dependent predictive model; and calculating the film thickness using the layer-dependent predictive model.

3. The method of claim 2, wherein the one or more parameters are selected from a group consisting of a theoretical ICE transmittance spectrum, a measured film thickness of a deposited layer, and a simulated film thickness of a layer to be deposited.

4. The method of claim 1, further comprising:
combining two or more simplified ICEs to form an ICE combination; and
recalibrating the ICE combination after fabrication using a neural network.

5. The method of claim 1, further comprising:
analyzing one or more performance components of each ICE design candidate;
identifying a local optimum for each of the one or more performance components; and
wherein the refined simulation analysis is performed around the local optimum for each of the one or more performance components of each ICE design candidate.

6. The method of claim 5, further comprising:
detecting one or more local optimums of the one or more performance components of each ICE design candidate based, at least in part, on the one or more performance components;
determining one or more performance sensitivities of the one or more performance components to a change in layer thickness; and
wherein selecting the simplified ICE from the number of ICE design candidates for fabrications is further based, at least in part, on the one or more performance components, the one or more local optimums, and the one or more sensitivities.

7. The method of claim 5, wherein the one or more performance components are selected from a group consisting of a Standard Error of Calibration ("SEC"), a Detector Output Sensitivity ("DOS"), and a Percentage of Sensor Transmittance ("PST").

8. The method of claim 5, further comprising:
performing a simulation analysis on each ICE design candidate based on the first thickness, the second thickness and the number of possible thicknesses.

9. The method of claim 8, wherein selecting the simplified ICE design candidate for fabrication comprises:
selecting an ICE design candidate based on at least one of the simulation analysis on each ICE design candidate and the refined simulation analysis around the local optimum.

10. The method of claim 1, wherein the two-hidden-layer neural network comprises as a default ten nodes on the first film layer and the second film layer.

* * * * *